United States Patent
Lu et al.

(10) Patent No.: US 10,813,016 B2
(45) Date of Patent: Oct. 20, 2020

(54) MEASUREMENT METHOD FOR WIRELESS COMMUNICATION NETWORK, BASE STATION, AND TERMINAL

(71) Applicant: Baicells Technologies Co. Ltd., Beijing (CN)

(72) Inventors: Yang Lu, Beijing (CN); Lixin Sun, Beijing (CN); Yingzhe Ding, Beijing (CN)

(73) Assignee: Baicells Technologies Co. Ltd., Beijing (CN)

(*) Notice: Subject to any disclaimer, the term of this patent is extended or adjusted under 35 U.S.C. 154(b) by 146 days.

(21) Appl. No.: 16/315,394

(22) PCT Filed: Jun. 30, 2017

(86) PCT No.: PCT/CN2017/090975
§ 371 (c)(1),
(2) Date: Feb. 6, 2019

(87) PCT Pub. No.: WO2018/006753
PCT Pub. Date: Jan. 11, 2018

(65) Prior Publication Data
US 2019/0215742 A1  Jul. 11, 2019

(30) Foreign Application Priority Data
Jul. 4, 2016 (CN) .......... 2016 1 0517690

(51) Int. Cl.
*H04W 36/00* (2009.01)
*H04W 36/30* (2009.01)
(Continued)

(52) U.S. Cl.
CPC ....... *H04W 36/0085* (2018.08); *H04W 24/10* (2013.01); *H04W 28/00* (2013.01);
(Continued)

(58) Field of Classification Search
None
See application file for complete search history.

(56) References Cited

U.S. PATENT DOCUMENTS

| 2015/0215944 | A1* | 7/2015 | Kim | .......... H04L 5/001 370/329 |
| 2016/0135143 | A1 | 5/2016 | Won et al. | |

(Continued)

FOREIGN PATENT DOCUMENTS

| CN | 105208593 A | 12/2015 |
| CN | 105307190 A | 2/2016 |

(Continued)

OTHER PUBLICATIONS

Extended European Search Report for European Application No. 17823565.1, dated Oct. 18, 2019 (Oct. 18, 2019)—11 pages.

(Continued)

*Primary Examiner* — Otis L Thompson, Jr.
(74) *Attorney, Agent, or Firm* — Culhane Meadows PLLC; Stephen J. Weed

(57) ABSTRACT

A measurement method for wireless communication networks, a base station and a terminal are provided. The method includes transmitting measurement configuration information to a terminal, wherein the measurement configuration information includes measurement object configuration information carrying a differentiation indication usable to differentiate a measurement object type; receiving a measurement result transmitted by the terminal after the terminal measures a determined measurement object which is determined according to the differentiation indication by the terminal, the measurement object type includes a Licensed-Assisted Access (LAA) cell configured with LAA frequency bins, a Long Term Evolution (LTE) cell configured with LTE frequency bins, or a MulteFire cell configured (Continued)

---

41 — transmitting measurement configuration information to a terminal, wherein the measurement configuration information includes measurement object configuration information, the measurement object configuration information carries a differentiation indication used to differentiate a measurement object type 42 — receiving a measurement result transmitted by the terminal after the terminal measures a determined measurement object, wherein the determined measurement object is determined according to the differentiation indication by the terminal with MulteFire frequency bins; and the differentiation indication is an Absolute Radio Frequency Channel Number.

20 Claims, 7 Drawing Sheets

(51) Int. Cl.
*H04W 28/00* (2009.01)
*H04W 36/14* (2009.01)
*H04W 24/10* (2009.01)
*H04W 72/04* (2009.01)

(52) U.S. Cl.
CPC ... *H04W 36/0022* (2013.01); *H04W 36/0027* (2013.01); *H04W 36/0058* (2018.08); *H04W 36/0069* (2018.08); *H04W 36/0072* (2013.01); *H04W 36/14* (2013.01); *H04W 36/30* (2013.01); *H04W 72/0453* (2013.01)

(56) References Cited

U.S. PATENT DOCUMENTS

| | | | |
|---|---|---|---|
| 2016/0330641 A1 | 11/2016 | Zhang et al. | |
| 2017/0311195 A1* | 10/2017 | Martin | H04W 24/10 |
| 2017/0339580 A1* | 11/2017 | Martin | H04W 24/02 |
| 2018/0041906 A1 | 2/2018 | Jang et al. | |
| 2018/0091994 A1* | 3/2018 | Ozturk | H04L 27/0006 |
| 2018/0176835 A1* | 6/2018 | Park | H04W 74/0808 |
| 2018/0343650 A1 | 11/2018 | Zhou | |
| 2019/0021014 A1* | 1/2019 | Martin | H04W 24/10 |
| 2019/0053087 A1* | 2/2019 | Callender | H04B 17/309 |
| 2019/0140752 A1* | 5/2019 | Annam | H04W 48/16 |
| 2019/0182729 A1* | 6/2019 | Lu | H04W 36/0094 |
| 2019/0215084 A1* | 7/2019 | Nurminen | H04W 16/14 |
| 2019/0273578 A1* | 9/2019 | Jeon | H04B 17/102 |
| 2020/0068378 A1* | 2/2020 | Lunden | H04L 47/27 |

FOREIGN PATENT DOCUMENTS

| | | |
|---|---|---|
| CN | 105722229 A | 6/2016 |
| WO | 2013059999 A1 | 5/2013 |
| WO | 2015109516 A1 | 7/2015 |
| WO | 2016089019 A1 | 6/2016 |

OTHER PUBLICATIONS

"3 Generation Partnership Project; Technical Specification Group Radio Access Network; Evolved Universal Terrestrial Radio Access (E-UTRA); Radio Resource Control (RRC); Protocol Specification (Release 11)", 3GPP Standard; 3GPP TS 36.331, V11.16., Jun. 2016, France (360 pages).

1st Chinese Office Action for Chinese Application No. 201610517690.7, dated Nov. 5, 2019 (Nov. 5, 2019)—7 pages (English translation—7 pages).

International Search Report and Written Opinion for International Application No. PCT/CN/2017/090975, dated Oct. 10, 2017 (Oct. 10, 2017)—17 pages.

* cited by examiner transmitting measurement configuration information to a terminal, wherein the
measurement configuration information includes measurement object configuration
information, the measurement object configuration information carries a differentiation
indication used to differentiate a measurement object type; the differentiation indication
is a second EARFCN of a cell of a MulteFire network, and the measurement object type
is the cell of the MulteFire network;
the differentiation indication is further used to indicate measuring at designated
frequency bins in designated frequency bands of the MulteFire network or measuring at
an entirety of frequency bins in frequency bands of a designated MulteFire network or
measuring at a subset of frequency bins in frequency bands of a designated MulteFire
network; or the measurement object configuration information further carries a
MulteFire frequency-band indication field, the MulteFire frequency-band indication
field is used to indicate measuring at the entirety of the frequency bins in the frequency
bands of the designated MulteFire network or a subset of the frequency bins in the
frequency bands of the designated MulteFire network — 51 receiving a measurement result transmitted by the terminal after the terminal measures a
determined measurement object, wherein the determined measurement object is
determined according to the differentiation indication by the terminal — 52

Fig. 5 transmitting measurement configuration information to a terminal, wherein the
measurement configuration information includes measurement object configuration
information, the measurement object configuration information carries a differentiation
indication used to differentiate a measurement object type;
the measurement object type includes a LAA cell configured with LAA frequency bins,
a LTE cell configured with LTE frequency bins, or a MulteFire cell configured with
MulteFire frequency bins; the differentiation indication is the EARFCN, wherein
frequency bins for the LAA in the differentiation indication correspond to the first
EARFCN, frequency bins for the MulteFire correspond to the second EARFCN, and
frequency bins for the LTE correspond to the third EARFCN — 61 receiving a measurement result transmitted by the terminal after the terminal measures a
determined measurement object, wherein the determined measurement object is
determined according to the differentiation indication by the terminal — 62

Fig. 6

MEASUREMENT METHOD FOR WIRELESS COMMUNICATION NETWORK, BASE STATION, AND TERMINAL

CROSS-REFERENCE TO RELATED APPLICATION

The present application is a U.S. national phase application of PCT Application No. PCT/CN2017/090975 filed on Jun. 30, 2017, which claims a priority of a Chinese patent application No. 201610517690.7 filed in China on Jul. 4, 2016, a disclosure of which is incorporated herein in its entirety by reference.

TECHNICAL FIELD

The present disclosure relates to a field of measuring wireless communication networks, and specifically, relates to a measurement method for wireless communication networks, a base station and a terminal.

BACKGROUND

In a technique named Licensed Assisted Access (LAA) specified by a standard organization of Third Generation Partnership Project (3GPP), a carrier in a non-licensed frequency band uses a physical layer technique satisfying a Long Term Evolution (LTE) standard. In order to ensure that a device based on the LAA and another device operating in the non-licensed frequency band (such as a Wireless Fidelity (Wi-Fi) device) may share a channel in the non-licensed frequency band equally and avoid the devices operating in the non-licensed frequency band from interfering with each other, a mechanism called Listen Before Talk (LBT) and similar to a carrier sense technique in the Wi-Fi is introduced at a physical layer of the LAA for a carrier in the non-licensed frequency band. In a case that a base station (BS) or a terminal senses a channel in the non-licensed frequency band is occupied, i.e. in a case that the LBT fails, the BS or the terminal stops transmitting a signal. In a case that the BS or the terminal senses that the channel is free, i.e., in a case that the LBT succeeds, the BS or the terminal transmits a signal. A LAA carrier cannot work independently in a terminal operating in the non-licensed frequency band. A carrier aggregation technique has to be used to aggregate the LAA carrier and a carrier in a licensed frequency band. The carrier in the licensed frequency band may be in a Primary Cell (PCell) serving the terminal, and the LAA carrier may be in a Secondary Cell (SCell) serving the terminal.

MulteFire (MF) is also a radio access technique based on the LTE and using the non-licensed frequency band. Different from the LAA, the MulteFire may operate in the non-licensed frequency band independently without aid of the licensed frequency band. The LBT mechanism is also introduced into a physical layer of the MulteFire so as to prevent interference among devices. Both the LAA technique in the 3GPP and carriers in the non-licensed frequency band of the MulteFire use frequency bins in Band 46 (5150 MHz to 5925 MHz) of an Evolved Universal Terrestrial Radio Access Network (EUTRAN).

The MulteFire provides two network-architecture access modes, i.e., a Public Land Mobile Network (PLMN) access mode and a Neutral Host Network (NHN) access mode. The NHN access mode is a network mode in which a MulteFire Radio Access Network (RAN) is connected with a MulteFire Core Network (CN). The MulteFire CN is a unifiedly-planned and self-organized neutral network newly introduced in the MulteFire, and does not support a RAN-level handover procedure in a 3GPP network. A MulteFire RAN broadcasts a NHN network ID (NHN-ID) and a Participating Service Provider Identity (PSP-ID). An Evolved Packet Core (EPC) connection mode is a network mode in which the MulteFire RAN is connected with a relevant 3GPP core network. A terminal may perform a S1-level handover or a X2-level handover between the MulteFire RAN and the 3GPP RAN, and the MulteFire RAN broadcasts a PLMN ID. A handover of the terminal between networks in the above two access modes is not supported.

In the LAA of the LTE, in order to add or remove a SCell of the LAA serving a terminal, the base station in the LTE indicates, through a measurement configuration in a Radio Resource Control (RRC) signaling message, the terminal to measure a signal quality of a cell of the LAA, and determines whether the SCell of the LAA serving the terminal is to be added or removed according the signal quality reported by the terminal after the terminal measured the signal quality in a LAA channel. For example, in a case that the signal quality of a neighboring cell of the LAA is at least higher than a signal quality of a current serving cell by a predetermined threshold, the base station adds the cell of the LAA as the SCell serving the terminal.

A current 3GPP standard supports the terminal to hand over from a LTE network to another network based on other radio access technologies (RAT), such as a GSM/EDGE radio access network (GERAN), a UMTS radio access network (UTRAN), CDMA2000, UMTS Radio Access (UTRA), and WLAN (wireless area network). In order to enable the terminal to hand over from the LTE network to another network based on other RATs, the base station in the LTE indicates, through the measurement configuration in the RRC signaling message, the terminal to perform measurement of neighboring cells, and determines whether the terminal should hand over to a corresponding neighboring cell of the other RAT, according to the signal quality reported by the terminal after the terminal performs the measurement at a channel in the GERAN, UTRAN, CDMA2000, UTRA and the WLAN.

The base station informs the terminal to measure the channel quality of a cell of another RAT or a cell of other frequencies at central frequency bins (i.e., EUTRAN Absolute Radio Frequency Channel Numbers (EARFCN)) of the RAT or at central frequency bins of other frequencies through a measurement object in a measurement configuration in a Radio Resource Control (RRC) message. The base station indicates, by using an EUTRAN measurement object information element MeasObjectEUTRA carrying the EAR-FCNs in the Band 46, the terminal to measure the channel quality of the LAA cell at channel frequency bins corresponding to the EARFCNs.

However, after the MulteFire access technology is introduced, the EUTRAN measurement object information element MeasObjectEUTRA may not indicate whether the measurement object is directed to a measurement to a LAA neighboring cell or to a measurement to a MulteFire neighboring cell. Furthermore, since an operational frequency band and operational frequency bins of a MulteFire base station may be changed, the base station (including the MulteFire base station and a LTE base station) may not know the operational frequency bins of an adjacent MulteFire base station. Thus, the base station needs to indicate the terminal to perform measurement on an entirety or a part of frequency bands of the MulteFire, and the MeasObject-EUTRA cannot currently indicate the terminal to measure the channel quality of the MulteFire cell on the entirety or a part of the frequency bands of the MulteFire.

How to enable the base station to differentiate a LAA measurement object from a MulteFire measurement object when performing a handover measurement, and how to enable the terminal to measure the channel quality at frequency bins of the entirety of the frequency bands of the MulteFire, are problems to be addressed.

SUMMARY

A measurement method for wireless communication networks, a base station and a terminal are provided in the present disclosure, and may enable the terminal to differentiate a measurement object type of a measurement object, such as a measurement object for a Licensed Assisted Access (LAA) and a measurement object for a MulteFire, and enable the terminal to measure channel qualities at an entirety or a part of frequency bins of frequency band of the MulteFire, so that the terminal may hand over from a Long Term Evolution (LTE) network to a MulteFire network.

In a first aspect, some embodiments of the present disclosure provide a measurement method for a wireless communication network. The method includes transmitting measurement configuration information to a terminal, wherein the measurement configuration information includes measurement object configuration information, the measurement object configuration information carries a differentiation indication used to differentiate a measurement object type; and receiving a measurement result transmitted by the terminal after the terminal measures a determined measurement object, wherein the determined measurement object is determined according to the differentiation indication by the terminal, the measurement object type includes a LAA cell configured with LAA frequency bins, a LTE cell configured with LTE frequency bins, or a MulteFire cell configured with MulteFire frequency bins; and the differentiation indication is an Absolute Radio Frequency Channel Number.

In a second aspect, some embodiments of the present disclosure provide a measurement method for a wireless communication network. The method includes: receiving measurement configuration information transmitted by a base station, wherein the measurement configuration information includes measurement object configuration information, the measurement object configuration information carries a differentiation indication used to differentiate a measurement object type; determining a measurement object according to the differentiation indication, wherein the measurement object type comprises a LAA cell configured with LAA frequency bins, a LTE cell configured with LTE frequency bins, or a MulteFire cell configured with MulteFire frequency bins, and the differentiation indication is an Absolute Radio Frequency Channel Number; measuring the determined measurement object and obtaining a measurement result; and transmitting the measurement result to the base station.

In a third aspect, some embodiments of the present disclosure provide a measurement apparatus for a wireless communication network, the measurement apparatus is applied in a base station and includes: a transmission module, configured to transmit measurement configuration information to a terminal, wherein the measurement configuration information includes measurement object configuration information, the measurement object configuration information carries a differentiation indication used to differentiate a measurement object type; a reception module, configured to receive a measurement result transmitted by the terminal after the terminal measures a determined measurement object, wherein the determined measurement object is determined according to the differentiation indication by the terminal, the measurement object type includes a Licensed Assisted Access (LAA) cell configured with LAA frequency bins, a Long Term Evolution (LTE) cell configured with LTE frequency bins, or a MulteFire cell configured with MulteFire frequency bins; and the differentiation indication is an Absolute Radio Frequency Channel Number.

In a fourth aspect, some embodiments of the present disclosure further provide a base station. The base station includes: a transmitter, configured to transmit measurement configuration information to a terminal, wherein the measurement configuration information includes measurement object configuration information, the measurement object configuration information carries a differentiation indication used to differentiate a measurement object type; a receiver, configured to receive a measurement result transmitted by the terminal after the terminal measures a determined measurement object, wherein the determined measurement object is determined according to the differentiation indication by the terminal, the measurement object type includes a Licensed Assisted Access (LAA) cell configured with LAA frequency bins, a Long Term Evolution (LTE) cell configured with LTE frequency bins, or a MulteFire cell configured with MulteFire frequency bins; and the differentiation indication is an Absolute Radio Frequency Channel Number.

In a fifth aspect, some embodiments of the present disclosure further provide a measurement apparatus for a wireless communication network, the measurement apparatus is applied in a terminal and includes a reception module, configured to receive measurement configuration information transmitted by a base station, wherein the measurement configuration information includes measurement object configuration information, the measurement object configuration information carries a differentiation indication used to differentiate a measurement object type; a determination module, configured to determine a measurement object according to the differentiation indication, wherein the measurement object type includes a Licensed Assisted Access (LAA) cell configured with LAA frequency bins, a Long Term Evolution (LTE) cell configured with LTE frequency bins, or a MulteFire cell configured with MulteFire frequency bins, and the differentiation indication is an Absolute Radio Frequency Channel Number; a measurement module, configured to measure the determined measurement object and obtain a measurement result; and a transmission module, configured to transmit the measurement result to the base station.

In a sixth aspect, some embodiments of the present disclosure further provide a terminal. The terminal includes a receiver, a processor, and a transmitter. The receiver is configured to receive measurement configuration information transmitted by a base station, wherein the measurement configuration information includes measurement object configuration information, the measurement object configuration information carries a differentiation indication used to differentiate a measurement object type. The processor is configured to: determine a measurement object according to the differentiation indication, wherein the measurement object type includes a Licensed Assisted Access (LAA) cell configured with LAA frequency bins, a Long Term Evolution (LTE) cell configured with LTE frequency bins, or a MulteFire cell configured with MulteFire frequency bins, and the differentiation indication is an Absolute Radio Frequency Channel Number; and measure the determined measurement object and obtain a measurement result. The transmitter is configured to transmit the measurement result to the base station.

The above technical solutions of the present disclosure at least have following advantages: the technical solutions of the present disclosure man enable a terminal to differentiate a measurement object type, such as a LAA measurement object and a MulteFire measurement object, and enable the terminal to determine a channel quality (i.e. a measurement result) of a determined measurement object according to the differentiation indication, so that the base station may obtain the channel quality of the determined measurement object reported by the terminal, and further implement a handover procedure of the terminal.

BRIEF DESCRIPTION OF THE DRAWINGS

FIG. 5 is a flowchart of a measurement method for wireless communication networks performed at a base station side according to some embodiments of the present disclosure;

FIG. 6 is a flowchart of a measurement method for wireless communication networks performed at a base station side according to some embodiments of the present disclosure;

DETAILED DESCRIPTION

Figure 1:
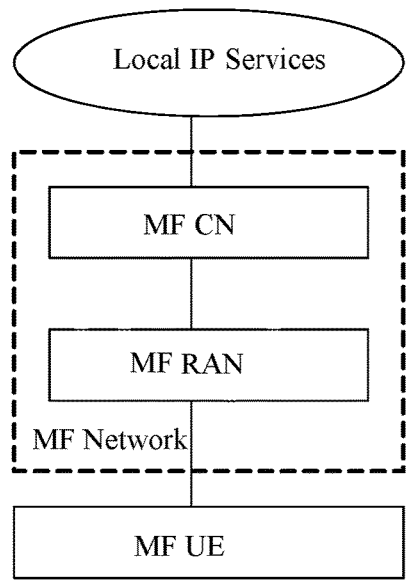
FIG. 1 is an architecture diagram of a NHN access mode of a MulteFire.

Exemplary embodiments of the present disclosure will be described in details hereinafter in conjunction with drawings. Although the exemplary embodiments are shown in the drawings, it should be understood that the embodiments of the present disclosure may be implemented in various ways, and the present disclosure is not limited by the embodiments described herein. On the contrary, these embodiments of the present disclosure are provided to understand the present disclosure more thoroughly, and convey the scope of the present disclosure to one of ordinary skills in the art completely.

Figure 2:
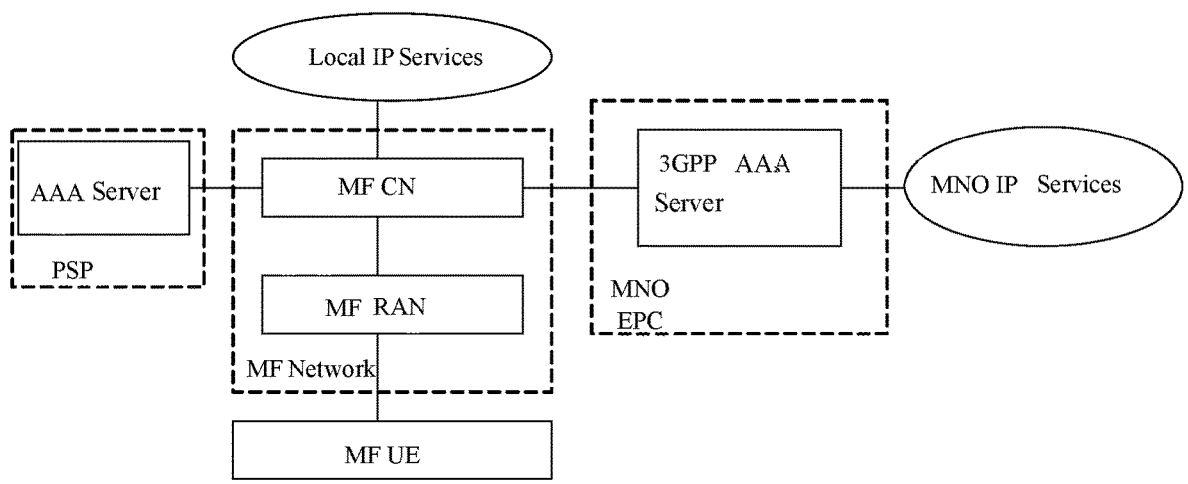
FIG. 2 is another architecture diagram of the NHN access mode of the MulteFire.
Figure 3:
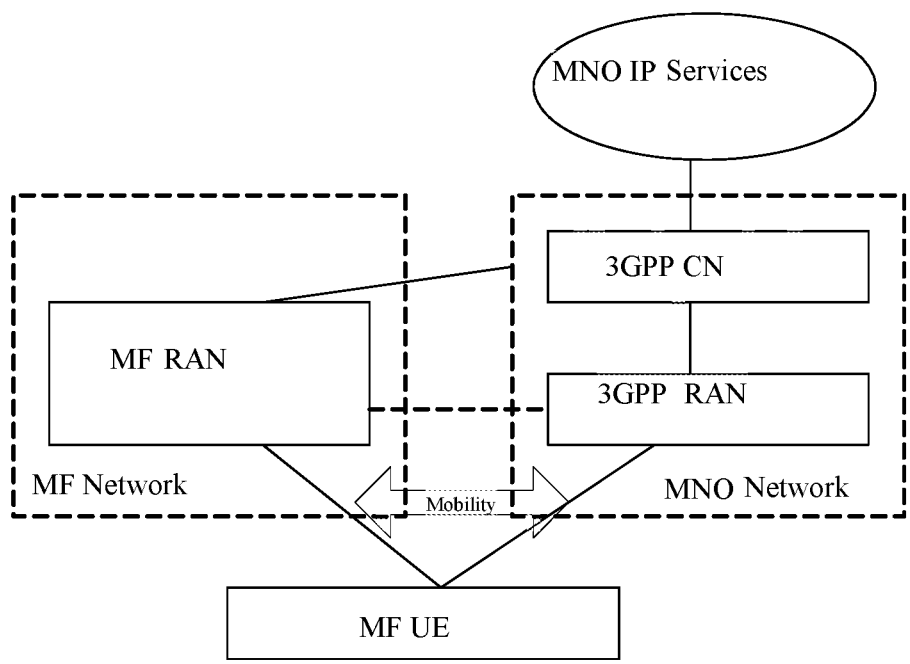
FIG. 3 is an architecture diagram of a PLMN access mode of the MulteFire.

FIG. 1 is an architecture diagram of a NHN access mode of a MulteFire; FIG. 2 is another architecture diagram of the NHN access mode of the MulteFire; FIG. 3 is an architecture diagram of a PLMN access mode of the MulteFire. As shown in FIG. 1 to FIG. 3, the NHN access mode is a network mode in which a MulteFire Radio Access Network (RAN) is connected with a MulteFire Core Network (CN). The MulteFire CN is a unifiedly planned and self-organized neutral network newly introduced in the MulteFire, and does not support a RAN-level handover procedure in the 3GPP network. A NHN network ID (NHN-ID) and a PSP-ID is broadcast in the MulteFire RAN. An Evolved Packet Core (EPC) connection mode is a network mode for connecting a MulteFire RAN with a relevant 3GPP core network. A terminal may perform a S1 handover or a X2 handover between the MulteFire RAN and the 3GPP RAN, and the MulteFire RAN broadcasts a PLMN ID. As shown in FIG. 3, a handover between the above two access modes by the terminal is not supported.

After the MulteFire access technology is introduced, the EUTRAN measurement object information element MeasObjectEUTRA may not indicate whether the measurement object is directed to a measurement to a LAA neighboring cell or to a measurement to a MulteFire neighboring cell. Furthermore, since an operational frequency band and operational frequency bins of a MulteFire base station may be changed, the base station (including the MulteFire base station and the LTE base station) may not know the operational frequency bins of an adjacent MulteFire base station. Thus, the base station needs to indicate the terminal to perform measurement in an entirety or a part of frequency bands of the MulteFire, and the MeasObjectEUTRA cannot indicate the terminal to measure the channel quality of the MulteFire cell in the entirety or a part of the frequency bands of the MulteFire.

In the related art, in a MulteFire network in a Public Land Mobile Network (PLMN) access mode or in a Long Term Evolution (LTE) network, a terminal is only allowed to hand over a MulteFire cell in a Registered Public Land Mobile Network (RPLMN) of the terminal or an Equivalent Public Land Mobile Network (EPLMN) of the terminal. In the MulteFire network in the NHN access mode, the terminal is only allowed to handover inside a current NH network (i.e., cells configured with a same NHN-ID).

Since the MulteFire operates in the non-licensed frequency band, MulteFire networks of a plurality of Mobile Network Operators (MNOs) may probably use same operational frequency bins concurrently, i.e., the terminal may measure MulteFire cells of a plurality of PLMNs or MulteFire cells of a plurality of NH networks at a non-licensed frequency bin.

According to the related art, measurement results of MulteFire cells satisfying a measurement report criterion may be transmitted to the base station in a descending order of channel qualities of the MulteFire cells by the terminal. The terminal probably transmits, to the base station, multiple measurement results of the MulteFire cells needing not to be measured, and probably cannot transmit, to the base station, a measurement result of a MulteFire cell needed by the base station. This significantly increases uplink signaling overheads, reduces system performance, and even cannot achieve a purpose of the measurement.

Some embodiments of the present disclosure provide a measurement method for wireless communication networks, a base station and a terminal. Directed to problems in the related art that a measurement object of a LAA neighboring cell and a measurement object of a MulteFire neighboring cell cannot be differentially indicated and how to enable the terminal to measure frequency bins in an entirety or a part of frequency bands of the MulteFire, some embodiments of the present disclosure may enable the terminal to differentiate the measurement object of the LAA from the measurement object of the MulteFire, and enable the terminal to measure channel qualities at frequency bins of the entirety or the part of the frequency bands of the MulteFire, so that the handover between the LTE network and the MulteFire network by the terminal may be supported. Additionally, directed to a measurement process in a MulteFire cell, the method of the present disclosure may enable the terminal to report measurement results of MulteFire cells needed by the base station to the base station, and thus may avoid the terminal from transmitting, to the base station, measurement results of MulteFire cells needing not to be measured. In this way, the uplink signaling overheads may be reduced, the system performance may be enhanced, and measurements to MulteFire cells may be effectively performed.

Figure 4:
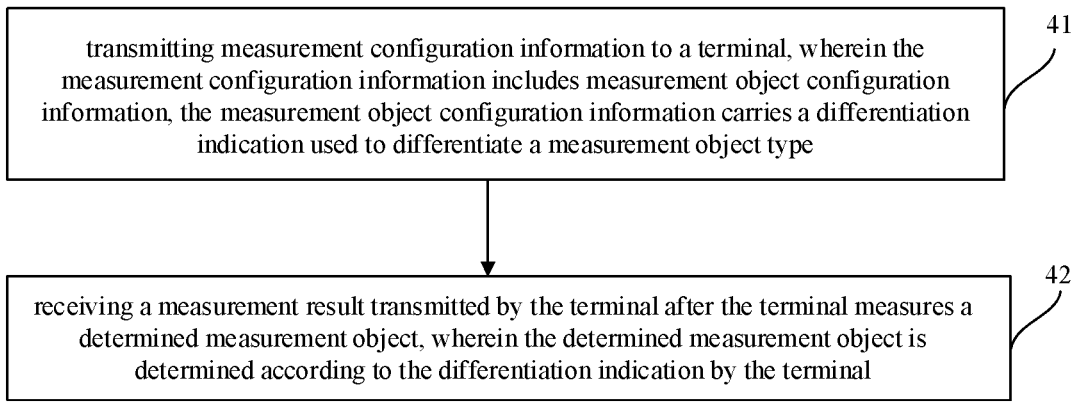
FIG. 4 is a flowchart of a measurement method for wireless communication networks performed at a base station side according to some embodiments of the present disclosure.

FIG. 4 is a flowchart of a measurement method for wireless communication networks according to some embodiments of the present disclosure. The method is performed at a base station side and includes steps 41 and 42.

Step 41: transmitting measurement configuration information to a terminal, wherein the measurement configuration information includes measurement object configuration information, the measurement object configuration information carries a differentiation indication used to differentiate a measurement object type.

Step 42: receiving a measurement result transmitted by the terminal after the terminal measures a determined measurement object, wherein the determined measurement object is determined according to the differentiation indication by the terminal.

In some embodiments, the measurement configuration information is provided with a measurement configuration information ID, wherein the measurement configuration information ID is used to identify the measurement configuration information.

The measurement object type may include a LAA cell configured with LAA frequency bins, a LTE cell configured with LTE frequency bins, or a MulteFire cell configured with MulteFire frequency bins. The differentiation indication may be one or more EUTRAN Absolute Radio Frequency Channel Numbers (EARFCNs).

In some embodiments, the differentiation indication indicates the measurement object is the LAA cell configured with the LAA frequency bins, the LTE cell configured with the LTE frequency bins or the MulteFire cell configured with the MulteFire frequency bins. For example, a first EARFCN is an EARFCN used for the LAA frequency bins, a second EARFCN is an EARFCN used for the MulteFire Frequency bins, and a third EARFCN is an EARFCN corresponding to the LTE frequency bins.

In the LTE, a channel in each usable operating frequency band, Band, is identified by EARFCNs. A range of the EARFCNs is 0-262143.

TABLE 1

| EUTRA Operating Frequency Band | Operating Frequency Band in Uplink Receiving by BS Transmitting by Terminal $F_{UL\_low}$-$F_{UL\_high}$ | Operating Frequency Band in downlink Transmitting by BS Receiving by Terminal $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD[2] |
| 30 | 2305 MHz-2315 MHz | 2350 MHz-2360 MHz | FDD |
| 31 | 452.5 MHz-457.5 MHz | 462.5 MHz-467.5 MHz | FDD |

TABLE 1-continued

| EUTRA Operating Frequency Band | Operating Frequency Band in Uplink Receiving by BS Transmitting by Terminal $F_{UL\_low}$-$F_{UL\_high}$ | Operating Frequency Band in downlink Transmitting by BS Receiving by Terminal $F_{DL\_low}$-$F_{DL\_high}$ | Duplex Mode |
|---|---|---|---|
| 32 | N/A | 1452 MHz-1496 MHz | FDD[2] |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD[8,9] |
| ... | | | |
| 64 | | Reserved | |
| 65 | 1920 MHz-2010 MHz | 2110 MHz-2200 MHz | FDD |
| 66 | 1710 MHz-1780 MHz | 2110 MHz-2200 MHz | FDD[4] |
| 67 | N/A | 738 MHz-758 MHz | FDD[2] |
| 68 | 698 MHz-728 MHz | 753 MHz-783 MHz | FDD |

The EUTRANs have 68 operating frequency bands. A correspondence between the operating frequency bands of the EUTRAN sand the EARFCNs is shown in FIG. 1 and FIG. 2. Both the current 3GPP LAA cell and the MulteFire cell use a frequency band, Band 46, having a frequency range from 5150 MHz to 5925 MHz, i.e., use frequency bins in the non-licensed frequency band, Band 46.

TABLE 2

| EUTRA Operating Frequency Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 1 | 2110 | 0 | 0-599 | 1920 | 18000 | 18000-18599 |
| 2 | 1930 | 600 | 600-1199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4949 | 1427.9 | 22750 | 22750-22949 |
| 12 | 729 | 5010 | 5010-5179 | 699 | 23010 | 23010-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |
| 17 | 734 | 5730 | 5730-5849 | 704 | 23730 | 23730-23849 |
| 18 | 860 | 5850 | 5850-5999 | 815 | 23850 | 23850-23999 |
| 19 | 875 | 6000 | 6000-6149 | 830 | 24000 | 24000-24149 |
| 20 | 791 | 6150 | 6150-6449 | 832 | 24150 | 24150-24449 |
| 21 | 1495.9 | 6450 | 6450-6599 | 1447.9 | 24450 | 24450-24599 |
| 22 | 3510 | 6600 | 6600-7399 | 3410 | 24600 | 24600-25399 |
| 23 | 2180 | 7500 | 7500-7699 | 2000 | 25500 | 25500-25699 |
| 24 | 1525 | 7700 | 7700-8039 | 1626.5 | 25700 | 25700-26039 |
| 25 | 1930 | 8040 | 8040-8689 | 1850 | 26040 | 26040-26689 |
| 26 | 859 | 8690 | 8690-9039 | 814 | 26690 | 26690-27039 |
| 27 | 852 | 9040 | 9040-9209 | 807 | 27040 | 27040-27209 |
| 28 | 758 | 9210 | 9210-9659 | 703 | 27210 | 27210-27659 |
| 29[2] | 717 | 9660 | 9660-9769 | | | N/A |
| 30 | 2350 | 9770 | 9770-9869 | 2305 | 27660 | 27660-27759 |
| 31 | 462.5 | 9870 | 9870-9919 | 452.5 | 27760 | 27760-27809 |
| 32[2] | 1452 | 9920 | 9920-10359 | | | N/A |
| 33 | 1900 | 36000 | 36000-36199 | 1900 | 36000 | 36000-36199 |

TABLE 2-continued

| EUTRA Operating Frequency Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 34 | 2010 | 36200 | 36200-36349 | 2010 | 36200 | 36200-36349 |
| 35 | 1850 | 36350 | 36350-36949 | 1850 | 36350 | 36350-36949 |
| 36 | 1930 | 36950 | 36950-37549 | 1930 | 36950 | 36950-37549 |
| 37 | 1910 | 37550 | 37550-37749 | 1910 | 37550 | 37550-37749 |
| 38 | 2570 | 37750 | 37750-38249 | 2570 | 37750 | 37750-38249 |
| 39 | 1880 | 38250 | 38250-38649 | 1880 | 38250 | 38250-38649 |
| 40 | 2300 | 38650 | 38650-39649 | 2300 | 38650 | 38650-39649 |
| 41 | 2496 | 39650 | 39650-41589 | 2496 | 39650 | 39650-41589 |
| 42 | 3400 | 41590 | 41590-43589 | 3400 | 41590 | 41590-43589 |
| 43 | 3600 | 43590 | 43590-45589 | 3600 | 43590 | 43590-45589 |
| 44 | 703 | 45590 | 45590-46589 | 703 | 45590 | 45590-46589 |
| 45 | 1447 | 46590 | 46590-46789 | 1447 | 46590 | 46590-46789 |
| 46[4] | 5150 | 46790 | 46790-54539 | 5150 | 46790 | 46790-54539 |
| ... | | | | | | |
| 64 | | | Reserved | | | |
| 65 | 2110 | 65536 | 65536-66435 | 1920 | 131072 | 131072-131971 |
| 66[5] | 2110 | 66436 | 66436-67335 | 1710 | 131972 | 131972-132671 |
| 67[2] | 738 | 67336 | 67336-67535 | | N/A | |
| 68 | 753 | 67536 | 67536-67835 | 698 | 132672 | 132672-132971 |

A relation between the EARFCN and a central frequency bin of channel in the operating frequency band, Band, is shown below:

$$F_{DL}=F_{DL\_low}+0.1(N_{DL}-N_{Offs-DL})$$

$$F_{UL}=F_{UL\_low}+0.1(N_{UL}-N_{Offs-UL})$$

wherein, $F_{DL}$ is a central frequency bin in a downlink operating frequency band, $F_{DL\_low}$ is a lowest frequency value of the downlink operating frequency band, $N_{DL}$ is a downlink EARFCN, $N_{Offs-DL}$ is an EARFCN offset in the downlink operating frequency band, $F_{UL}$ is a central frequency bin of a uplink operating frequency band, $F_{UL-low}$ is a lowest frequency value in a uplink operating frequency band, $N_{UL}$ is a uplink EARFCN, and $N_{Offs-UL}$ is an EARFCN offset in the uplink operating frequency band.

In the embodiments of the present disclosure, the measurement configuration information is transmitted to the terminal, wherein the measurement configuration information includes the measurement object configuration information, the measurement object configuration information carries the differentiation indication used to differentiate the measurement object type; and the measurement result transmitted by the terminal after the terminal measures the determined measurement object is received, wherein the determined measurement object is determined by the terminal according to the differentiation indication. The terminal may differentiate the type of the measurement object according to the differentiation indication, such as differentiate the LAA cell from the MulteFire cell, and enable the terminal to measure the channel quality (i.e., the measurement result) of the measurement object determined according to the differentiation indication, so that the base station may obtain the channel quality of the determined measurement object reported by the terminal, thereby facilitating the terminal to implement a network handover procedure of the terminal.

FIG. 5 is a flowchart of a measurement method for wireless communication networks according to some embodiments of the present disclosure. The method is performed at a base station side and includes steps 51 and 52.

Step 51: transmitting measurement configuration information to a terminal, wherein the measurement configuration information includes measurement object configuration information, the measurement object configuration information carries a differentiation indication used to differentiate a measurement object type; the differentiation indication is a second EARFCN of a cell of a MulteFire network, and the measurement object type is the cell of the MulteFire network.

The differentiation indication is further used to indicate measuring at designated frequency bins in designated frequency bands of the MulteFire network or measuring at an entirety of frequency bins in frequency bands of a designated MulteFire network or measuring at a subset of frequency bins in frequency bands of a designated MulteFire network; or the measurement object configuration information further carries a MulteFire frequency-band indication field, the MulteFire frequency-band indication field is used to indicate measuring at the entirety of the frequency bins in the frequency bands of the designated MulteFire network or a subset of the frequency bins in the frequency bands of the designated MulteFire network.

Step 52: receiving a measurement result transmitted by the terminal after the terminal measures a determined measurement object, wherein the determined measurement object is determined according to the differentiation indication by the terminal.

In some embodiments of the present disclosure, the terminal may be instructed to measure a MulteFire cell configured with MulteFire frequency bins, and further be instructed to measure an entirety of the MulteFire frequency bins, a subset of the MulteFire frequency bins or a single MulteFire frequency bin, and thereby the system performance may be increased and an effective measurement to a MulteFire neighboring cell may be performed.

FIG. 6 is a flowchart of a measurement method for wireless communication networks according to some embodiments of the present disclosure. The method is performed at a base station side and includes steps 61 and 62.

Step 61: transmitting measurement configuration information to a terminal, wherein the measurement configuration information includes measurement object configuration information, the measurement object configuration information carries a differentiation indication used to differentiate a measurement object type.

The measurement object type may include a LAA cell configured with LAA frequency bins, a LTE cell configured with LTE frequency bins, or a MulteFire cell configured with MulteFire frequency bins. The differentiation indication is the EARFCN, wherein frequency bins for the LAA in the differentiation indication correspond to the first EARFCN, frequency bins for the MulteFire correspond to the second EARFCN, and frequency bins for the LTE correspond to the third EARFCN.

Specifically, for sake of differentiating the MulteFire network from the LAA network, it needs to configure the MulteFire and the LAA to use different EARFCN ranges. Two different configurations for the second EARFCN of the MultiFire are provided.

First configuration: the first EARFCN corresponding to the frequency bins of the LAA and the second EARFCN corresponding to the frequency bins of the MulteFire use a same frequency band, the first EARFCN corresponding to the frequency bins of the LAA and the second EARFCN corresponding to the frequency bins of the MulteFire are different, and the first EARFACN and the second EARFACN use a same frequency band, and the first EARFACN is an EARFCN in a frequency band being actually used, and the second EARFCN is an EARFCN in a frequency band not being actually used.

Second configuration: the first EARFCN corresponding to the frequency bins of the LAA and the second EARFCN corresponding to the frequency bins of the MulteFire are different, and the first EARFCN and the second EARFCN use different frequency bands. Further, the first EARFCN is an EARFCN in a frequency band being actually used, and the second EARFCN is a channel number corresponding to a frequency band number not being defined currently, the specific frequency band number is provided with a corresponding undefined EARFCN.

Step 62: receiving a measurement result transmitted by the terminal after the terminal measures a determined measurement object, wherein the determined measurement object is determined according to the differentiation indication by the terminal.

In the first configuration, the EARFCNs of the MulteFire and the LAA belong to numbers in a same frequency band. The EARFCNs of the MulteFire and the LAA use different EARFCN values in a same non-licensed frequency band.

Since a spacing between frequency bins usable actually in the non-licensed frequency band (such as Band 46) in the EUTRAN is 20 MHz, but a spacing between frequency bins in frequency bands currently defined is 100 KHz, a quantity of EARFCNs in the non-licensed frequency band is far more than a quantity of EARFCN being actually used.

The LAA uses the EARFCN usable actually. In order to differentiate the LAA from the MulteFire, the MulteFire may be configured to use the EARFCN not being used actually, the EARFCN of some MulteFire networks may also represent the entirety or a subset of the frequency bins in the frequency bands of the MulteFire.

A relation between the EARFCNs being used actually and central frequency bins in the non-licensed frequency band is represented by a formula below, and the user equipment (terminal) may calculate the central frequency bins for the measurement object according to the EARFCN:

$$F_{DL}=F_{DL\_low}+0.1(N_{DL}-N_{Offs-DL})$$

$$F_{UL}=F_{UL\_low}+0.1(N_{UL}-N_{Offs-UL})$$

wherein, $F_{DL\_low}$ is a lowest frequency value in a downlink operating frequency band, $F_{DL}$ is a central frequency bin of the downlink operating frequency band, $N_{DL}$ is a downlink EARFCN, $N_{Offs-DL}$ is an EARFCN offset in the downlink operating frequency band, $F_{UL\_low}$ is a lowest frequency value in a uplink operating frequency band, $F_{UL}$ is a central frequency bin of the uplink operating frequency band, $N_{UL}$ is a uplink EARFCN, and $N_{Offs-UL}$ is an EARFCN offset in the uplink operating frequency band.

Since the MulteFire uses the EARFCN not being used, a mapping relation between the EARFCN of the MulteFire and an EARFCN (i.e. a reference EARFCN) being actually used needs to be configured in each frequency bands of the MulteFire.

After the terminal receives the measurement configuration transmitted by the base station, the terminal determines the EARFCN of the MulteFire according to the EARFCN in the measurement configuration, and converts the EARFCN of the MulteFire in the measurement configuration to the reference EARFCN corresponding to the EARFCN in the measurement configuration, and calculates the central frequency bins of the measurement object according to the reference EARFCN and the formula for calculating the central frequency bins.

In some embodiments, the mapping relation between the MulteFire EARFCN and the reference EARFCN is configured.

In the Band 46, the mapping relation between the MulteFire (MF) EARFCN and the reference EARFCN is shown in Table 3.

MF-EARFCN-1 to MF-EARFCN-39 are 39 EARFCNs in the Band 46 used for the MulteFire, MF-GROUP-EARFCN-0 is a set of all EARFCNs in the Band 46 of the MulteFire, MF-GROUP-EARFCN-1 to MF-GROUP-EARFCN-4 are four subsets of MF EARFCNs in the Band 46, wherein n1-n4 are predetermined values increasing in order and a range of n1 to n4 is 0 to 39.

After the terminal receives the measurement configuration transmitted by the base station, the terminal determines the EARFCN of the MulteFire according to the EARFCN in the measurement configuration, and converts the EARFCN of the MulteFire in the measurement configuration to the reference EARFCN corresponding to the MF EARFCN in the measurement configuration according to the mapping relation between the MF EARFCN and the reference EARFCN, and calculates the central frequency bins of the measurement object according to the reference EARFCN.

TABLE 3

| MF operating frequency band | MF EARFCN | Reference EARFCN |
|---|---|---|
| Band46 (EARFCN Range 46790-54539) | MF-EARFCN-1 | 46790 |
| | MF-EARFCN-2 | 46990 |
| | MF-EARFCN-3 | 47190 |
| | MF-EARFCN-4 | 47390 |
| | MF-EARFCN-5 | 47590 |
| | MF-EARFCN-6 | 47790 |
| | ... | ... |
| | MF-EARFCN-38 | 59190 |
| | MF-EARFCN-39 | 59390 |
| | MF-GROUP-EARFCN-0 | $\{46790 + 200 * m\}, 0 \leq m < 39$ |
| | MF-GROUP-EARFCN-1 | $\{46790 + 200 * m\}, 0 \leq m < n1$ |
| | MF-GROUP-EARFCN-2 | $\{46790 + 200 * m\}, n1 \leq m < n2$ |

TABLE 3-continued

| MF operating frequency band | MF EARFCN | Reference EARFCN |
|---|---|---|
| | MF-GROUP-EARFCN-3 | {46790 + 200 * m}, n2 ≤ m < n3 |
| | MF-GROUP-EARFCN-4 | {46790 + 200 * m}, n3 ≤ m < n4 |

In some embodiments, a spacing between each MulteFire EARFCN and the reference EARFCN (i.e., the EARFCN being used actually) corresponding to the MulteFire EARCN may be configured as K, wherein K<200.

In some embodiments, since frequency bins may be fine-tuned, the reference EARFCN may be fine-tuned between two EARFCNs and K<198.

After the terminal receives the measurement configuration transmitted by the base station, the terminal determines the EARFCN of the MulteFire according to the EARFCN in the measurement configuration, and calculates the reference EARFCN corresponding to the EARFCN of the MulteFire as (N-K), wherein N is the MF EARFCN, the terminal converts the MF EARFCN in the measurement configuration to the reference EARFCN corresponding to the EARFCN in the measurement configuration, and calculates the central frequency bins of the measurement object according to the reference EARFCN and the formula for calculating the central frequency bins.

The MF EARFCN and the central frequency bins in the frequency bands of the MulteFire satisfy a formula below:

$$F_{DL}=F_{DL\_low}+0.1(N_{DL}-N_{Offs-DL})$$

$$F_{UL}=F_{UL\_low}+0.1(N_{UL}-N_{Offs-UL})$$

wherein, $F_{DL}$ is a central frequency bin in a downlink operating frequency band, $F_{DL\_low}$ is a lowest frequency value of a downlink operating frequency band, $N_{DL}$ is a downlink EARFCN, $N_{Offs-DL}$ is an EARFCN offset in the downlink operating frequency band, $F_{UL-low}$ is a lowest frequency value in a uplink operating frequency band, $F_{UL}$ is a central frequency bin of the uplink operating frequency band, $N_{UL}$ is a uplink MF EARFCN, and $N_{Offs-UL}$ is an EARFCN offset in the uplink operating frequency band; K is a spacing between the EARFCN and reference EARFCN corresponding to the EARFCN.

In some embodiments, some EARFCNs actually not being used may be additionally used to represent the entirety or the subset of the frequency bins in the non-licensed frequency band.

In the above second configuration, the MulteFire and the LAA are assigned with different frequency-band numbers. Specifically, specific frequency-band numbers are assigned to the MulteFire, and a specific frequency-band number is assigned to each non-licensed frequency band used by the MulteFire, and the MulteFire uses an EUTRAN Band number (Band47-Band63 or Band69-Band255) not being defined currently. Meanwhile, EARFCNs in each frequency band number of the MulteFire are configured, and the MF EARFCN is configured to use EARFCNs currently undefined (54540-65535, or 67836-262143).

Additionally, EARFCNs currently being undefined may also be used to indicate the entirety or the subset of the frequency bands of the MulteFire.

For example, the Band 46 may be configured to correspond to a specific frequency band, Band 255, of the MulteFire, as shown in Table 4. The LAA uses the Band 46, the MulteFire uses the Band 255, and frequency ranges of both the Band 46 and the Band 255 are 5150 MHz-5925 MHz, only frequency-band numbers of the Band 46 and the Band 255 are different.

A range of EARFCNs in the Band 255 is from 254381 to 262135, shown in Table 5. 254381 to 262130 represent a single EARFCN, 262131 represents the entirety of the EARFCNs in the Band 255, and 262132 to 262135 are used to represent a subset of the EARFCNs in the Band 255, as shown in Table 6; or 262132 to 262135 are used to represent sub-frequency-bands in the Band 255, as shown in Table 7.

The relation between the MF EARFCNs and the central frequency bins in the non-licensed frequency bands satisfy the formula for calculating the relation between the EARFNs and the central frequency bins:

$$F_{DL}=F_{DL\_low}+0.1(N_{DL}-N_{Offs-DL})$$

$$F_{UL}=F_{UL\_low}+0.1(N_{UL}-N_{Offs-UL})$$

wherein, $F_{DL\_low}$ is a lowest frequency value in a downlink operating frequency band, $F_{DL}$ is a central frequency bin of the downlink operating frequency band, $N_{DL}$ is a downlink MF EARFCN, $N_{Offs-DL}$ is an EARFCN offset in the downlink operating frequency band; $F_{UL-ow}$ is a lowest frequency value in a uplink operating frequency band, $F_{UL}$ is a central frequency bin of the uplink operating frequency band, $N_{UL}$ is a uplink MF EARFCN, and $N_{Offs-UL}$ is an EARFCN offset in the uplink operating frequency band.

In this example, since some frequency-band numbers of the MulteFire and some frequency-band numbers of the LAA are different, the frequency-band numbers occupies different EARFCNs.

TABLE 4

| E-UTRA Operating Frequency Band | Uplink Operating Frequency Band Receiving by the BS Transmitting by the Terminal $F_{UL\_low}$-$F_{UL\_high}$ | Downlink Operating Frequency Band Transmitting by the BS Receiving by the Terminal $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |

TABLE 4-continued

| E-UTRA Operating Frequency Band | Uplink Operating Frequency Band Receiving by the BS Transmitting by the Terminal $F_{UL\_low}$-$F_{UL\_high}$ | Downlink Operating Frequency Band Transmitting by the BS Receiving by the Terminal $F_{DL\_low}$-$F_{DL\_high}$ | Duplex Mode |
|---|---|---|---|
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD[2] |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD[2] |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD[8,9] |
| ... | | | |
| 64 | | Reserved | |
| 65 | 1920 MHz-2010 MHz | 2110 MHz-2200 MHz | FDD |
| 66 | 1710 MHz-1780 MHz | 2110 MHz-2200 MHz | FDD[4] |
| 67 | N/A | 738 MHz-758 MHz | FDD[2] |
| 68 | 698 MHz-728 MHz | 753 MHz-783 MHz | FDD |
| ... | | | |
| 255 | 5150 MHz-5925 MHz | 5150 MHz-5925 MHz | TDD |

TABLE 5

| E-UTRA Operating Frequency Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 1 | 2110 | 0 | 0-599 | 1920 | 18000 | 18000-18599 |
| 2 | 1930 | 600 | 600-1199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4949 | 1427.9 | 22750 | 22750-22949 |
| 12 | 729 | 5010 | 5010-5179 | 699 | 23010 | 23010-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |
| 17 | 734 | 5730 | 5730-5849 | 704 | 23730 | 23730-23849 |
| 18 | 860 | 5850 | 5850-5999 | 815 | 23850 | 23850-23999 |
| 19 | 875 | 6000 | 6000-6149 | 830 | 24000 | 24000-24149 |
| 20 | 791 | 6150 | 6150-6449 | 832 | 24150 | 24150-24449 |
| 21 | 1495.9 | 6450 | 6450-6599 | 1447.9 | 24450 | 24450-24599 |

TABLE 5-continued

| E-UTRA Operating Frequency Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 22 | 3510 | 6600 | 6600-7399 | 3410 | 24600 | 24600-25399 |
| 23 | 2180 | 7500 | 7500-7699 | 2000 | 25500 | 25500-25699 |
| 24 | 1525 | 7700 | 7700-8039 | 1626.5 | 25700 | 25700-26039 |
| 25 | 1930 | 8040 | 8040-8689 | 1850 | 26040 | 26040-26689 |
| 26 | 859 | 8690 | 8690-9039 | 814 | 26690 | 26690-27039 |
| 27 | 852 | 9040 | 9040-9209 | 807 | 27040 | 27040-27209 |
| 28 | 758 | 9210 | 9210-9659 | 703 | 27210 | 27210-27659 |
| 29[2] | 717 | 9660 | 9660-9769 | | N/A | |
| 30 | 2350 | 9770 | 9770-9869 | 2305 | 27660 | 27660-27759 |
| 31 | 462.5 | 9870 | 9870-9919 | 452.5 | 27760 | 27760-27809 |
| 32[2] | 1452 | 9920 | 9920-10359 | | N/A | |
| 33 | 1900 | 36000 | 36000-36199 | 1900 | 36000 | 36000-36199 |
| 34 | 2010 | 36200 | 36200-36349 | 2010 | 36200 | 36200-36349 |
| 35 | 1850 | 36350 | 36350-36949 | 1850 | 36350 | 36350-36949 |
| 36 | 1930 | 36950 | 36950-37549 | 1930 | 36950 | 36950-37549 |
| 37 | 1910 | 37550 | 37550-37749 | 1910 | 37550 | 37550-37749 |
| 38 | 2570 | 37750 | 37750-38249 | 2570 | 37750 | 37750-38249 |
| 39 | 1880 | 38250 | 38250-38649 | 1880 | 38250 | 38250-38649 |
| 40 | 2300 | 38650 | 38650-39649 | 2300 | 38650 | 38650-39649 |
| 41 | 2496 | 39650 | 39650-41589 | 2496 | 39650 | 39650-41589 |
| 42 | 3400 | 41590 | 41590-43589 | 3400 | 41590 | 41590-43589 |
| 43 | 3600 | 43590 | 43590-45589 | 3600 | 43590 | 43590-45589 |
| 44 | 703 | 45590 | 45590-46589 | 703 | 45590 | 45590-46589 |
| 45 | 1447 | 46590 | 46590-46789 | 1447 | 46590 | 46590-46789 |
| 46[4] | 5150 | 46790 | 46790-54539 | 5150 | 46790 | 46790-54539 |
| ... | | | | | | |
| 64 | | | Reserved | | | |
| 65 | 2110 | 65536 | 65536-66435 | 1920 | 131072 | 131072-131971 |
| 66[5] | 2110 | 66436 | 66436-67335 | 1710 | 131972 | 131972-132671 |
| 67[2] | 738 | 67336 | 67336-67535 | | N/A | |
| 68 | 753 | 67536 | 67536-67835 | 698 | 132672 | 132672-132971 |
| ... | | | | | | |
| 255 | 5150 | 254381 | 254381-262135 | 5150 | 254381 | 254381-262135 |

TABLE 6

| MulteFire Operating Frequency Band | Group MF EARFCN | Ranges of $N_{DL}/N_{UL}$ |
|---|---|---|
| 255 | 252131 | 254381-262130 |
| | 252132 | 254381-256319 |
| | 252133 | 256319-258257 |
| | 252134 | 258257-260195 |
| | 252135 | 260195-262130 |

TABLE 7

| MulteFire Operating Frequency Band | Group MF EARFCN | Frequency Range |
|---|---|---|
| 255 | 252131 | 5150 MHz-5925 MHz |
| | 252132 | 5150 MHz-5250 MHz |
| | 252133 | 5250 MHz-5350 MHz |
| | 252134 | 5470 MHz-5725 MHz |
| | 252135 | 5725 MHz-5925 MHz |

In some embodiments, the LAA cell configured with the LAA frequency bins and the MulteFire cell configured with the MulteFire frequency bins may be differentiated through the differentiation indication, and measurement performed at the entirety of the frequency bins in the frequency bands of the MulteFire or measurement performed at the subset of the frequency bins in the frequency bands of the MulteFire may also be instructed, thus the terminal may perform measurement to a cell in the LAA network or a cell in the MulteFire network, and a measurement result may be reported to the base station by the terminal.

Figure 7:
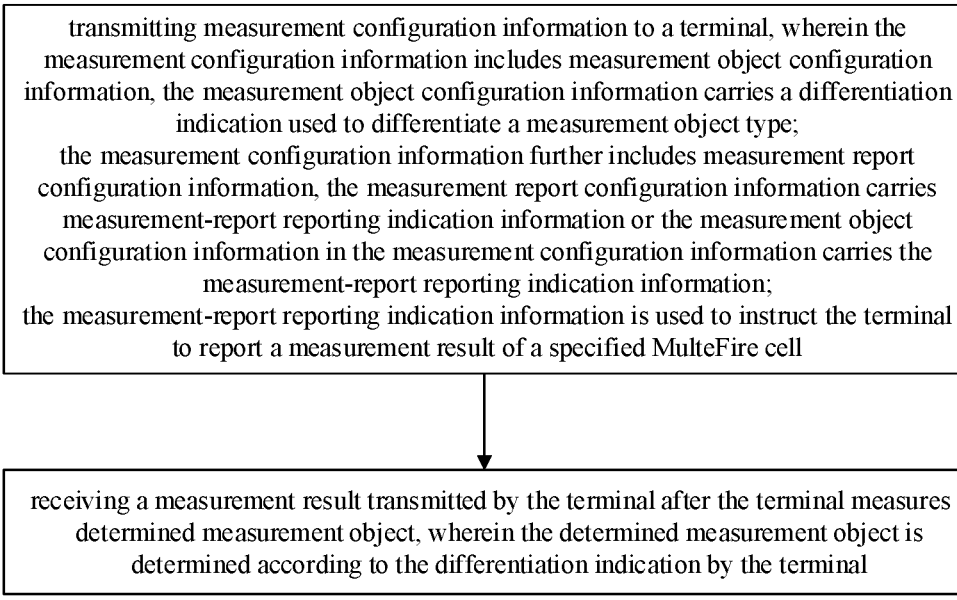
FIG. 7 is a flowchart of a measurement method for wireless communication networks performed at a base station side according to some embodiments of the present disclosure.

FIG. 7 is a flowchart of a measurement method for wireless communication networks according to some embodiments of the present disclosure. The method is performed at a base station side and includes steps 71 and 72.

Step 71: transmitting measurement configuration information to a terminal, wherein the measurement configuration information includes measurement object configuration information, the measurement object configuration information carries a differentiation indication used to differentiate a measurement object type.

The measurement configuration information further includes measurement report configuration information, the measurement report configuration information carries measurement-report reporting indication information or the measurement object configuration information in the measurement configuration information carries the measurement-report reporting indication information.

The measurement-report reporting indication information is used to instruct the terminal to report a measurement result of a specified MulteFire cell.

Step 72: receiving a measurement result transmitted by the terminal after the terminal measures a determined measurement object, wherein the determined measurement object is determined according to the differentiation indication by the terminal.

In the embodiments, the measurement-report reporting indication information is used to instruct the terminal to only report a measurement result of a MulteFire cell in a Public Land Mobile Network PLMN access mode or only report a measurement result of a MulteFire cell in a NHN access mode; or the measurement-report reporting indication information is used to instruct the terminal to only report a measurement result of a MulteFire cell configured with a specific Public Land Mobile Network ID (PLMN-ID) or a specific NHN-ID.

Further, the measurement-report reporting indication information being used to instruct the terminal to only report the measurement result of the MulteFire cell configured with the specific PLMN-ID or the specific NHN-ID, includes: the measurement-report reporting indication information includes a first PLMN-ID list, the measurement-report reporting indication information is configured to instruct the terminal to report a measurement result of a MulteFire cell configured with at least one PLMN-ID in a first PLMN-ID list included in a PLMN-ID list in a broadcast message; or the measurement-report reporting indication information includes a first NHN-ID list, the measurement-report reporting indication information is used to instruct the terminal to only report a measurement result of a MulteFire cell configured with a same NHN-ID as a NHN-ID in a NHN-ID list in the measurement-report reporting indication information when the NHN-ID in the NHN-ID list in the measurement-report reporting indication information is the same as the NHN-ID in the broadcast message.

Further, the measurement-report reporting indication information being used to instruct the terminal to only report a measurement result of a MulteFire cell configured with the specified PLMN-ID or the specified NHN-ID, includes: the measurement-report reporting indication information is used to instruct the terminal to only report a measurement result of a MulteFire cell allowing a handover.

The MulteFire cell allowing the handover, includes: a MulteFire cell in which a PLMN-ID list in a broadcast message includes a Registered Public Land Mobile Network RPLMN or an Equivalent Public Land Mobile Network EPLMN of a terminal, or a MulteFire cell configured with a same NHN-ID as that of a cell to which the terminal currently accesses.

Further, the measurement-report reporting indication information being used to instruct the terminal to only report a measurement result of a MulteFire cell allowing the handover, includes: the measurement-report reporting indication information is a si-RequestForHO field included in the measurement report configuration information, wherein the si-RequestForHO field is used to instruct the terminal to only report a measurement result of the MulteFire cell allowing the handover.

When the terminal reports the measurement result, on one hand, if the terminal receives the measurement configuration information transmitted by the base station, the terminal obtains the EARFCN field in the measurement object configuration information in the measurement configuration information, and the terminal may determine the measurement object to be the LAA cell, the LTE cell, or the MulteFire cell through the EARFCN field.

If the measurement object is the MulteFire cell, the terminal may further obtain the measurement object is a cell configured with the entirety of frequency bins of designated frequency bands in the MulteFire, or a cell configured with a subset of frequency bins of designated frequency bands in the MulteFire, according to the EARFCN or the frequency-band indication field of the MulteFire included in the measurement object configuration information.

The EARFCN and frequency-band indication field in the MulteFire is predefined by a system, and both a base station and a terminal may identify the EARFCN and the frequency-band indication field in the MulteFire.

The terminal may also obtain the measurement object is the entirety or a subset of the frequency bins in the MulteFire or a single frequency bin in the MulteFire through the EARFCN.

After the terminal measures a channel quality at the frequency bins of the MulteFire, if the measurement result satisfies a measurement report rule indicated by the measurement report configuration information included in the measurement configuration information, the terminal transmits a measurement result of a channel quality of the MulteFire to the base station by using a measurement result report IE (MeasResultEUTRA) of the EUTRAN in a measurement result message (MeasResults), the measurement result of the channel quality includes a Reference Signal Receiving Power (RSRP) of a cell, a Reference Signal Receiving Quality (RSRQ) and/or Cell Global Identifier (CGI) and the like of a cell, and the CGI of the cell includes a EUTRAN cell global identifier (ECGI) and a Tracking Area Code (TAC) and probably further includes PLMN information and a NHN-ID.

The measurement identifier (measID) in the measurement result message corresponds to and may be the same as the measurement identifier (measID) included in the measurement configuration message for the MulteFire. Each MeasResultEUTRA includes a measurement result of a cell, and one measurement result message at most includes measurement results of eight cells.

If the base station instructs, in the measurement configuration information of the MulteFire, the terminal to measure the entirety of the frequency bands in the MulteFire or the subset of the frequency bands in the MulteFire, but not measure a single frequency bin, the terminal needs to indicate information about the frequency bins of the MulteFire cell in the measurement result message when the terminal transmits the measurement result message, or indicates, in the measurement result IE (MeasResultEUTRA) of each MulteFire cell in the measurement result message (for example, adding an EARFCN field in the MeasResultEUTRA), the frequency bins of the MulteFire cell being measured, so that the base station may acquire the frequency bins in the measurement result message. If the base station indicates, in the measurement configuration of the MulteFire, that a single frequency bin is to be measured, the terminal does not need to indicate the EARFCN of the measured MulteFire cell in the measurement result message.

Information about the frequency bins in the measured frequency bands indicated in the measurement result message may be indicated in two ways as follow by the terminal.

First way: adding an EARFCN field in the measurement result IE (MeasResultEUTRA).

Second way: carrying information about frequency bins in other fields in the measurement result IE (MeasResultEUTRA).

For example, the terminal adds a field length occupied by a MeasID field in the measurement result IE, uses the MeasID to carry the information about the frequency bins, i.e., the MeasID field includes both measurement identifier information and the information about the measured frequency bins.

The information about the measured frequency bins may be the EARFCNs, or may be index values of the frequency bins in the measured frequency band.

If the base station instructs the terminal to measure the channel quality of the MulteFire cell at frequency bins in the entirety of the frequency bands of the MulteFire or the subset of the frequency bands of the MulteFire, the base station acquires the frequency bins corresponding to the measurement result from the information about the frequency bins in the measurement result message.

If the base station instructs the terminal to measure the channel quality of the MulteFire cell at frequency bins in the entirety of the frequency bands of the MulteFire or the subset of the frequency bands of the MulteFire through the EARFCN or the frequency-band indication field of the MulteFire in the measurement object configuration information, the base station acquires the frequency bins corresponding to the measurement result from the information about the frequency bins in the measurement result, and hands over the terminal from the LTE network to the MulteFire cell configured with the designated frequency bins, according to measurement results of the terminal at different frequency bins.

On the other hand, if the terminal receives the measurement configuration information transmitted by the base station, the terminal obtains the EARFCN field in the measurement object configuration information in the measurement configuration information, and the terminal may distinguish the measurement object to be the LAA cell, the LTE cell, or the MulteFire cell through the EARFCN field.

The terminal may also acquire that the measurement object is the entirety of the frequency bands of the MulteFire or the subset of the frequency bands of the MulteFire through the EARFCN or the frequency-band indication field of the MulteFire. The EARFCN and the frequency-band indication in the MulteFire is predefined by a system, and both the base station and the terminal may identify the EARFCN and the frequency-band indication in the MulteFire.

If the measurement result of the measurement object in the above MulteFire cell by the terminal satisfies a measurement report condition indicated in the measurement report configuration IE included in the measurement configuration, the terminal autonomously select, or select according to the measurement-report reporting indication information from the base station, the measurement result of the MulteFire cell and transmits the measurement result to the base station.

In the 3GPP network, a measurement report type configured in a measurement report configuration IE includes an event-triggered measurement report, a periodic measurement report and a CGI measurement report.

The event-triggered measurement report is configured for the handover. When a result of measurement to a MulteFire neighboring cell performed by the terminal satisfies a trigger condition of the event-triggered measurement report indicated in the measurement report configuration IE, the terminal reports the result of the measurement to the MulteFire neighboring cell to the base station in a descending order of the signal qualities. An EUTRAN measurement event includes events A1-A6, B1-B2 and C1-C2.

The periodic measurement report is configured for network optimization, such as an Automatic Neighbor Relationship (ANR) function, and the terminal periodically reports a measurement result of an adjacent cell with a strongest signal quality, and the terminal reports measurement results to the base station according to the descending sequence of the signal qualities.

The CGI measurement report is configured for solving a PCI (Physical Cell Identifier) confusion problem or performing the ANR, and when the terminal reads the CGI (including the ECGI, the TAC and the like) in a broadcast message of an adjacent cell designated by the base station, the CGI information of the cell is reported to the base station.

At present, in a MulteFire network in the PLMN access mode or in the LTE network, the neighbor relation is not allowed to be established with a MulteFire network in the NHN access mode, and the terminal is only allowed to be handed over to a MulteFire cell in RPLMN or an EPLMN of the terminal; in the MulteFire network in the NHN access mode, the neighbor relation is not allowed to be established with the MulteFire network in a PLMN access mode, and the terminal is only allowed to hand over within a current NH network (namely cells with the same NHN-ID). Since the MulteFire operates in the non-licensed frequency band, MulteFire networks of a plurality of Mobile Network Operators (MNOs) may probably use same operational frequency bins concurrently, i.e., the terminal may measure MulteFire cells of a plurality of PLMNs or MulteFire cells of a plurality of NH networks at a non-licensed frequency bin. If according to the related art, the measurement results of the MulteFire cells satisfying the measurement report criterion may be transmitted to the base station in the descending order of the channel qualities from a highest channel quality to a lowest channel quality by the terminal. The terminal probably transmits, to the base station, a plurality of measurement results of MulteFire cells needing not to be measured, and probably cannot transmit, to the base station, a measurement result of a MulteFire cell needed by the base station. This significantly increases uplink signaling overheads, reduces the system performance, and even cannot achieve a purpose of a measurement.

In order to save signaling overheads and measure the MulteFire neighboring cell more effectively, the terminal selects the measurement result of the MulteFire cell to be transmitted to the base station in two ways as follow.

First way: the terminal autonomously selects the measurement result of the MulteFire cell and transmits the measurement result to the base station.

When a network type of a current cell is the MulteFire network in the PLMN access mode or the LTE network, the terminal only transmits a measurement result of the MulteFire cell in the PLMN access mode to the base station, or only transmits, to the base station, a measurement result of the MulteFire cell which allows the terminal to hand over.

In some embodiments, the terminal may simultaneously transmit a measurement result of a cell to the base station according to the following three measurement report types, and may also transmit the measurement result of the cell to the base station according to the three measurement report types at different time points.

1. The Measurement Report Type is the Event-Triggered Measurement Report

When the measurement result of the MulteFire neighbor cell made by the terminal satisfies an event-triggered condition indicated in the measurement report configuration information element (Information Element (IE)), for purpose of only reporting the measurement result of the cell which allows the terminal to hand over, the terminal only reports the measurement result of the MulteFire cell in which a PLMN-ID list in a broadcast message includes a same PLMN as the RPLMN or the EPLMN. If a plurality of MulteFire cells satisfies the condition, measurement results of the plurality of MulteFire cells are reported in the descending order of channel qualities from a best channel quality to a worst channel quality. Each of the measurement results includes a PCI and the channel quality (RSRP and/or RSRQ) of one of the MulteFire cell.

When the measurement result of the MulteFire neighbor cell made by the terminal satisfies the event-triggered condition indicated in the measurement report configuration IE, the terminal only reports the measurement result of the MulteFire cell in the PLMN access mode; if the plurality of MulteFire cells satisfy the condition, the measurement results of the MulteFire cells are reported according to the descending order of the channel qualities. Each of the measurement results includes the PCI and the channel quality (RSRP and/or RSRQ) of the MulteFire cell.

Furthermore, in order to solve a problem that PCIs of MulteFire cells deployed by different MNOs conflict with each other, if the terminal acquires the CGI information of the MulteFire cells, the terminal may also incorporate the CGI information in the measurement results of the cells.

2. The Measurement Report Type is the Periodic Measurement Report

After the periodic measurement is carried out on the MulteFire neighbor cell by the terminal, only the measurement result of the MulteFire cell in the PLMN access mode is reported. If a plurality of MulteFire cells satisfies the condition, measurement results of the plurality of the MulteFire cells are reported in the descending order of the channel qualities. Each of the measurement results includes the PCI and the channel quality (RSRP and/or RSRQ) of the MulteFire cell. Furthermore, in order to solve a problem that PCIs of the MulteFire cells deployed by different MNOs conflict with each other, if the terminal acquires the CGI information of the MulteFire cells, the terminal may also incorporate the CGI information in the measurement results of the cells.

Optionally, when the terminal performs the periodic measurement on the MulteFire neighbor cell, a measurement result of a MulteFire cell with the same PLMN in the PLMN-ID list in the broadcast message as the RPLMN or the EPLMN is reported. If the plurality of MulteFire cells satisfies the condition, the measurement results of the MulteFire cells are reported according to the descending order of the channel qualities. Each of the measurement result includes the PCI and the channel quality (RSRP and/or RSRQ) of the MulteFire cell. Furthermore, in order to solve a problem that PCIs of MulteFire cells deployed by different MNOs conflict with each other, if the terminal acquires the CGI information of the MulteFire cells, the terminal may also incorporate the CGI information in the measurement results of the cells.

3. The Measurement Report Type is the CGI Measurement Report.

When the terminal measures the CGI of a designated target MulteFire cell, the terminal reports the ECGI and the TAC in the CGI information of the MulteFire cell. In order to save signaling overheads, the terminal does not report the NHN-ID, but only reports the PLMN-ID list of the MulteFire cell in the PLMN access mode, or a PLMN in the PLMN-ID list broadcast in the MulteFire cell, which is same as an RPLMN or an EPLMN.

When a network type of a current cell is the MulteFire network in the NHN access mode, the terminal only transmits the measurement result of the MulteFire cell in the NHN access mode to the base station, or only transmits, to the base station, the measurement result of the MulteFire cell in a NHN network which allows the terminal to hand over.

For example, the terminal may simultaneously transmit a measurement result of a cell to the base station according to the following three measurement report types, and may also transmit the measurement result of the cell to the base station according to the three measurement report types at different time points.

1. The Measurement Report Type is the Event-Triggered Measurement Report

When the measurement result of the MulteFire neighbor cell made by the terminal satisfies the event-triggered condition indicated in the measurement report configuration IE, the terminal only reports the measurement result of the MulteFire cell in the NHN access mode. If a plurality of MulteFire cells satisfies the condition, measurement results of the MulteFire cells are reported in the descending order of the channel qualities. The measurement result includes the PCI and the channel quality (RSRP and/or RSRQ) of a MulteFire cell.

Optionally, when the measurement result of the MulteFire neighbor cell made by the terminal satisfies the event-triggered condition indicated in the measurement report configuration IE, for sake of only reporting the measurement result of the MulteFire cell in the NHN network which allows the terminal to hand over, the terminal only reports the measurement result of the MulteFire cell, the broadcast message of which includes a same NHN-ID as that of a cell currently accessed; if the plurality of MulteFire cells satisfy the condition, the measurement results of the MulteFire cells are reported according to the descending order of the channel qualities. Each of the measurement result includes the PCI and the channel quality (RSRP and/or RSRQ) of the MulteFire cell.

Furthermore, in order to solve the problem that PCIs of MulteFire cells in different NH networks conflict with each other, if the terminal acquires the CGI information of the MulteFire cells, the terminal may also incorporate the CGI information in the measurement results of the cells, wherein the CGI information includes the NHN-IDs of the MulteFire cells.

2. The Measurement Report Type is the Periodic Measurement Report

After the periodic measurement is carried out on the MulteFire neighbor cells by the terminal, only the measurement result of the MulteFire cell in the NHN access mode is reported. If a plurality of MulteFire cells satisfies the condition, measurement results of the MulteFire cells are reported in the descending order of the channel qualities. Each of the measurement results includes the PCI and the channel quality (RSRP and/or RSRQ) of the MulteFire cell.

Optionally, after the periodic measurement is carried out on the MulteFire neighbor cells by the terminal, the terminal reports only the measurement result of the MulteFire cell with the same NHN-ID in the broadcast message as the NHN-ID of the cell currently accessed. If a plurality of MulteFire cells satisfies the condition, measurement results of the MulteFire cells are reported in the descending order of channel qualities. Each of the measurement results includes the PCI and the channel quality (RSRP and/or RSRQ) of the MulteFire cell.

Furthermore, in order to solve the problem that PCIs of MulteFire cells in different NH networks conflict with each other, if the terminal acquires the CGI information of the MulteFire cells, the terminal may also incorporate the CGI information in the measurement results of the cells, the CGI information includes the NHN-IDs.

3. The Measurement Report Type is the CGI Measurement Report.

When the terminal measures the CGI of a designated target MulteFire cell, the terminal reports the ECGI and the TAC in the CGI information of the MulteFire cell. In order to save signaling overheads, the PLMN-ID list is not reported. The terminal reports the NHN-ID, or only reports the NHN-ID of the MulteFire cell which is the same as the NHN-ID of the current cell.

Second way: the terminal, according to the measurement report reporting indication from the base station, selects a measurement result of a MulteFire cell satisfying the measurement report condition and required by the base station, and sends the measurement result to the base station.

The base station transmits the measurement report reporting indication field in the measurement object IE or the measurement report configuration IE in the measurement configuration.

The measurement report reporting indication field may be used to instruct the terminal to only report a measurement result of a MulteFire cell in the PLMN access mode or only report a measurement result of a MulteFire cell in the NHN access mode.

The measurement report reporting indication field may also be used to instruct the terminal to report a measurement result of a MulteFire cell in a specific PLMN or having a specific NHN-ID. For example, if the terminal accesses currently a MulteFire cell in the PLMN access mode or an LTE cell, the measurement report reporting indication is used to instruct the terminal to only report the measurement result of the MulteFire cell, the broadcast message of which includes the PLMN-ID list having the RPLMN or the EPLMN of the terminal. If the terminal accesses the MulteFire cell in the NHN access mode, the measurement report reporting indication is used to instruct the terminal to only report the measurement result of the MulteFire cell configured with the same NHN-ID as that of a cell currently being accessed.

Optionally, the measurement report reporting indication field includes a PLMN-ID list, and instructs the terminal to only report the measurement result of the MulteFire cell, the broadcast message of which includes a PLMN-ID list having at least one PLMN-ID in the PLMN-ID list in the measurement report reporting indication field; or the measurement report reporting indication field includes a NHN-ID list, and instructs the terminal to only report a measurement result of a MulteFire cell, a broadcast message of which includes at least one same NHN-ID as that in the NHN-ID list in the measurement report reporting indication field. The measurement report reporting indication field may be one or more fields.

For example, the measurement report reporting indication field is added in the measurement object IE or the measurement report configuration IE in the measurement configuration. The field is applicable to all measurement report types (the event-triggered measurement report, the periodic measurement report, or the CGI measurement report). The measurement report reporting indication field may be used to instruct the terminal to only report a measurement result of a MulteFire cell in the PLMN access mode or only report a measurement result of a MulteFire cell in the NHN access mode. Optionally, the field may be used to instruct the terminal to report a measurement result of a MulteFire cell configured with a specific PLMN-ID or a specific NHN-ID. The field may further include a PLMN-ID list or an NHN-ID list used to instruct the terminal to only report the measurement result of the MulteFire cell configured with a designated PLMN-ID or a designated NHN-ID.

The related si-RequestForHO field is used to instruct the terminal to only report the CGI information of the MulteFire cell allowing the terminal to hand over, and is applicable to a measurement for a case in which the measurement report type is the CGI measurement report.

Specifically, after the terminal receives the si-RequestForHO indication transmitted by the base station, and if the terminal currently accesses the MulteFire cell in the PLMN access mode or the LTE cell, then when the terminal measures and obtains the CGI of the designated target MulteFire cell, the terminal does not report the NHN-ID, but only reports a measurement result of a MulteFire cell in which the PLMN-ID list broadcast by the MulteFire cell is the same as the RPLMN or the EPLMN of the terminal. If the terminal accesses currently the MulteFire cell in the NHN access mode, then when the terminal measures and obtains the CGI of the designated target MulteFire cell, the terminal does not report the PLMN-ID list, but reports the measurement result of the MulteFire cell configured with the same NHN-ID as that of the cell currently being accessed.

In some embodiments, the base station receives the measurement result transmitted by the terminal, after the terminal measures the measurement object indicated in the measurement configuration transmitted by the base station. A network optimization may be performed according to the measurement result transmitted by the terminal, or the terminal hands over from the LTE network to the MulteFire neighbor cell, or a neighbor-cell relation is established between the base station and the MulteFire neighbor cell.

Additionally, directed to a measurement process of a MulteFire cell in the above embodiments, the method of the present disclosure may enable the terminal to report, to the base station, measurement results of MulteFire cells needed by the base station, and thus may avoid the terminal from transmitting measurement results of MulteFire cells needing not to be measured to the base station. In this way, uplink signaling overheads may be reduced, system performance may be enhanced, and measurements to MulteFire neighboring cells may be effectively performed.

Further, directed to problems in the related art that a measurement object in a LAA neighboring cell and a measurement object in a MulteFire neighboring cell may not be differentially indicated and how to enable the terminal to measure frequency bins in an entirety or a part of frequency bands of the MulteFire, some embodiments of the present disclosure may enable the terminal to differentiate the measurement object of the LAA from the measurement object of the MulteFire, and enable the terminal to measure channel qualities at frequency bins of the entirety or the part of the frequency bands of the MulteFire, so that the handover from the LTE network to the MulteFire network by the terminal may be supported.

Figure 8:
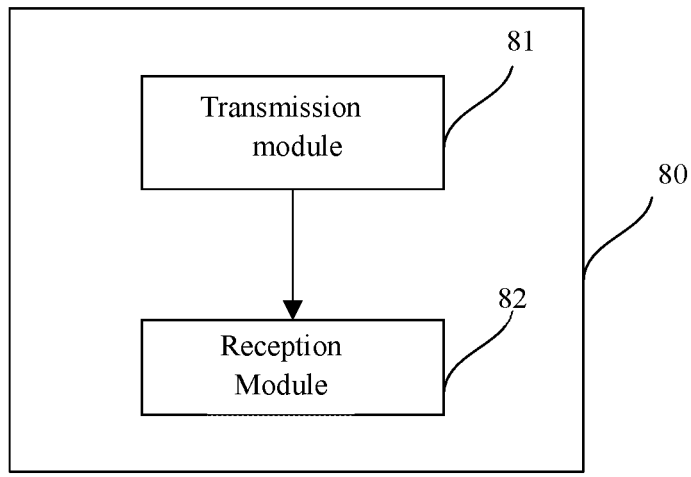
FIG. 8 is a structural block diagram of a measurement apparatus for wireless communication networks at a base station side according to some embodiments of the present disclosure.

FIG. 8 shows a measurement apparatus for a wireless communication network according to some embodiments of the present disclosure. The measurement apparatus 80 may be included in a base station and may include a transmission module 81 and a reception module 82.

The transmission module 81 is configured to transmit measurement configuration information to a terminal, wherein the measurement configuration information includes measurement object configuration information, the measurement object configuration information carries a differentiation indication used to differentiate a measurement object type.

The reception module 82 is configured to receive a measurement result transmitted after the terminal measures a determined measurement object, wherein the determined measurement object is determined according to the differentiation indication by the terminal.

The measurement object type may include a LAA cell configured with LAA frequency bins, a LTE cell configured with LTE frequency bins, or a MulteFire cell configured with MulteFire frequency bins. The differentiation indication is the EARFCN.

It is noted that, the above apparatus is an apparatus corresponding to the method shown in FIG. 4 to FIG. 7 of the present disclosure, and all implementations in the method in the FIG. 4 to FIG. 7 are applicable to the apparatus in the present disclosure and may achieve the same technical effects.

Figure 9:
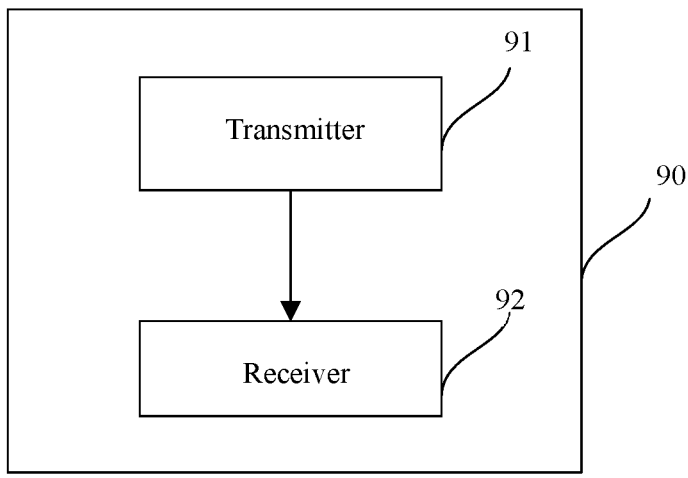
FIG. 9 is a structural block diagram of a base station according to some embodiments of the present disclosure.

FIG. 9 shows a base station according to some embodiments of the present disclosure. The base station 90 in FIG. 9 includes a transmitter 91 and a receiver 92.

The transmitter 91 is configured to transmit measurement configuration information to a terminal, wherein the measurement configuration information includes measurement object configuration information, the measurement object configuration information carries a differentiation indication used to differentiate a measurement object type.

The receiver 92 is configured to receive a measurement result transmitted after the terminal measures a determined measurement object, wherein the determined measurement object is determined according to the differentiation indication by the terminal.

The measurement object type may include a LAA cell configured with LAA frequency bins, a LTE cell configured with LTE frequency bins, or a MulteFire cell configured with MulteFire frequency bins. The differentiation indication is the EARFCN.

It is noted that, the above base station is an apparatus corresponding to the method shown in FIG. 4 to FIG. 7 of the present disclosure, and all implementations in the method in the embodiments shown in the FIG. 4 to FIG. 7 are applicable to the apparatus in the present disclosure and the same technical effects may be achieved.

Figure 10:
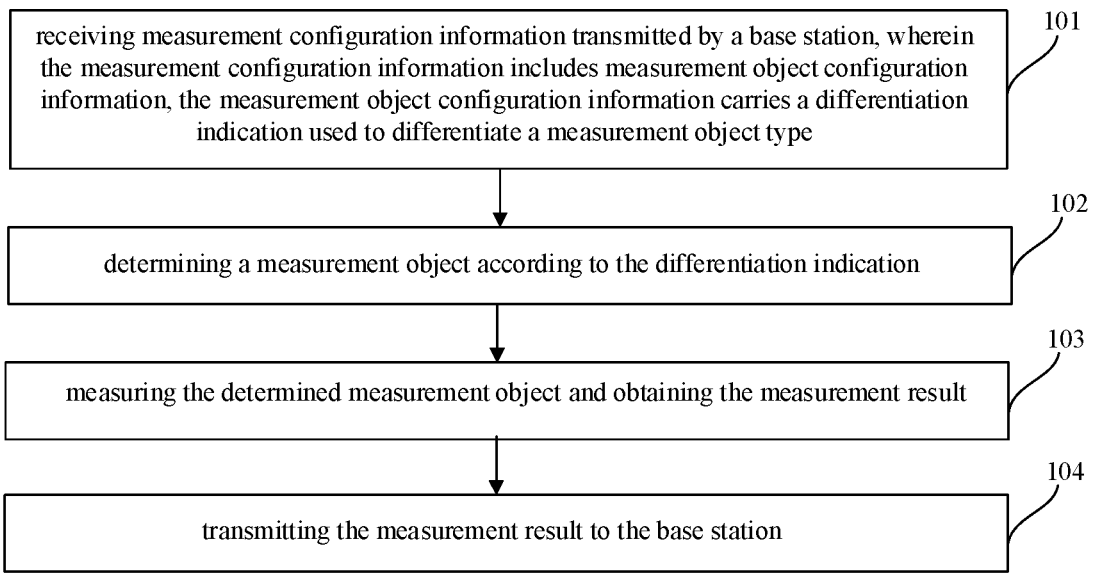
FIG. 10 is a flowchart of a measurement method for wireless communication networks performed at a terminal side according to some embodiments of the present disclosure.

FIG. 10 shows a flowchart of a measurement method for wireless communication networks according to some embodiments of the present disclosure. The method is performed at a terminal side and includes steps 101 to 104.

Step 101: receiving measurement configuration information transmitted by a base station, wherein the measurement configuration information includes measurement object configuration information, the measurement object configuration information carries a differentiation indication used to differentiate a measurement object type.

Step 102: determining a measurement object according to the differentiation indication, wherein the measurement object type includes a LAA cell configured with LAA frequency bins, a LTE cell configured with LTE frequency bins, or a MulteFire cell configured with MulteFire frequency bins. The differentiation indication is the EARFCN.

Step 103: measuring the determined measurement object and obtaining the measurement result.

Step 104: transmitting the measurement result to the base station.

In some embodiments of the present disclosure, the terminal determines, according to the differentiation indication in the measurement object configuration information received by the terminal, the measurement object to be measured, and the terminal measures the determined measurement object, obtains the measurement result and reports the measurement result to the base station. Thus, the terminal reports the measurement result needed by the base station to the base station, and the terminal may be avoided from transmitting measurement results of MulteFire cells needing not to be measured to the base station. In this way, uplink signaling overheads may be reduced, system performance may be enhanced, and measurements to MulteFire cells may be effectively performed.

Figure 11:
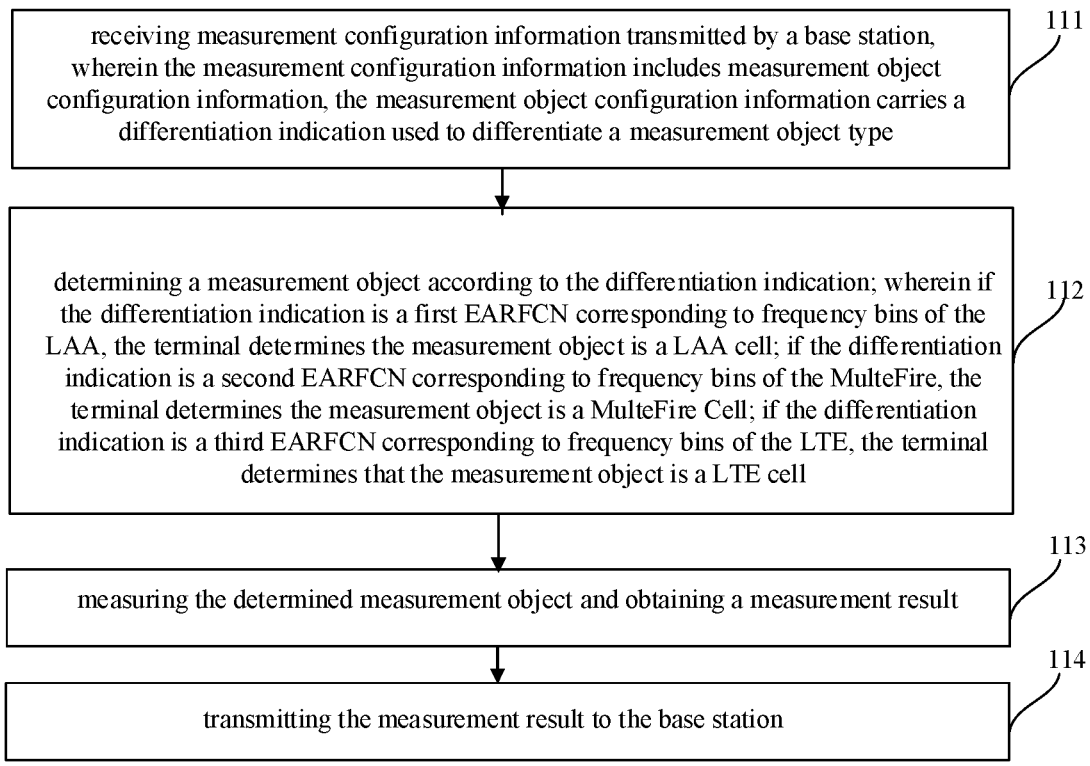
FIG. 11 is a flowchart of a measurement method for wireless communication networks performed at a terminal side according to some embodiments of the present disclosure.

FIG. 11 shows a flowchart of a measurement method for wireless communication networks according to some embodiments of the present disclosure. The method is performed at a terminal side and includes steps 111 to 114.

Step 111: receiving measurement configuration information transmitted by a base station, wherein the measurement configuration information includes measurement object configuration information, the measurement object configuration information carries a differentiation indication used to differentiate a measurement object type.

Step 112: determining a measurement object according to the differentiation indication; wherein if the differentiation indication is a first EARFCN corresponding to frequency bins of the LAA, the terminal determines the measurement object is a LAA cell; if the differentiation indication is a second EARFCN corresponding to frequency bins of the MulteFire, the terminal determines the measurement object is a MulteFire Cell; if the differentiation indication is a third EARFCN corresponding to frequency bins of the LTE, the terminal determines that the measurement object is a LTE cell.

Step 113: measuring the determined measurement object and obtaining a measurement result.

Step 114: transmitting the measurement result to the base station.

After the measurement object is determined to be MulteFire cell, the method further comprises: according to the second EARFCN or a frequency-band indication for the MulteFire carried in the measurement object configuration information, determining the measurement object is a cell configured with designated frequency bins in designated frequency bands of the MulteFire, or a cell configured with an entirety of frequency bins in designated frequency bands in the MulteFire, or a cell configured with a subset of frequency bins in designated frequency bands in the MulteFire.

The second EARFCN of the MulteFire network and the frequency-band indication for the MulteFire are predefined by a system, and both a base station and a terminal may identify the EARFCN and the frequency-band indication for the MulteFire.

If the measurement object is the cell configured with the entirety of frequency bins of the designated frequency bands of the MulteFire or the cell configured with the subset of frequency bins of the designated frequency bands of the MulteFire, the measurement result carries an indication field for indicating information about the measured frequency bins of the MulteFire, wherein the indication field is an EARFCN field added in the measurement result or any field in the measurement result.

Both the MulteFire and the LAA use non-licensed frequency bands currently and the LTE uses the licensed frequency bands currently. For sake of differentiating the MulteFire network from the LAA network, it needs to configure the MulteFire and the LAA use different EARFCN ranges. Two different configurations of the EARFCN for the MultiFire are provided.

First configuration: the first EARFCN corresponding to the frequency bins of the LAA is different from the second EARFCN corresponding to the frequency bins of the MulteFire, and the first EARFCN and the second EARFCN belong to same frequency bands.

The first EARFCN is an EARFCN in a frequency band actually being used; and the second EARFCN is an EARFCN in a frequency band actually not being used.

Further, the step 113 includes: obtaining central frequency bins of the MulteFire according to a mapping relation between the second EARFCN and the EARFCN in the frequency band being used actually; and measuring a cell configured with the central frequency bins of the MulteFire and obtaining the measurement result.

The Table 3 in the above embodiments is introduced into this configuration. Specifically, central frequency bins in downlink frequency bands of the MulteFire are obtained through a formula: $F_{DL}=F_{DL\_low}+0.(N_{DL}-N_{Offs-DL})$; and central frequency bins in uplink frequency bands of the MulteFire are obtained through a formula: $F_{UL}=F_{UL\_low}+0.1(N_{UL}-N_{Offs-UL})$.

$F_{DL\_low}$ is a lowest frequency value in a downlink operating frequency band, $F_{DL}$ is a central frequency bin of the downlink operating frequency band, $N_{DL}$ is an EARFCN in the downlink frequency band being used actually and corresponding to the second EARFACN, $N_{Offs-DL}$ is an EARFCN offset in the downlink operating frequency band, $F_{UL\_low}$ is a lowest frequency value in a uplink operating frequency band, $F_{UL}$ is a central frequency bin of the uplink operating frequency band, $N_{UL}$ is a uplink EARFCN in the uplink frequency band being used actually and corresponding to the second EARFCN, and $N_{Offs-UL}$ is an EARFCN offset in the uplink operating frequency band.

The EARFCN of the MulteFire and the EARFCN of the LAA use different EARFCN values in a same non-licensed frequency band. Since a spacing between frequency bins usable actually in the non-licensed frequency band (such as Band 46) in the EUTRAN is 20 MHz, but a spacing between frequency bins in frequency bands currently defined is 100 KHz, a quantity of EARFCN in the non-licensed frequency band is far more than a quantity of EARFCNs being actually used. The LAA occupies the EARFCNs usable actually. In order to differentiate the LAA from the MulteFire, the MulteFire may be configured to use EARFCNs being not used actually. The EARFCN of some MulteFire networks may also represent the entirety or the subset of the frequency bins in the frequency bands of the MulteFire.

In some embodiments, a spacing between each EARFCN of the MulteFire and a corresponding reference EARFCN (i.e., the EARFCN being used actually) may be configured as K, wherein K<200.

In some embodiments, since frequency bins may be fine-tuned, the reference EARFCN may be fine-tuned between two EARFCNs and K<198.

After the terminal receives the measurement configuration transmitted by the base station, the terminal determines the EARFCN of the MulteFire according to the EARFCN in the measurement configuration; calculates the reference EARFCN corresponding to the EARFCN of the MulteFire as (N-K), wherein N is the EARFCN of the MulteFire; converts the EARFCN of the MulteFire in the measurement configuration to the reference EARFCN corresponding to the EARFCN in the measurement configuration; and calculates central frequency bins of the measurement object according to the reference EARFCN and the formula for the central frequency bins.

Specifically, according to the mapping relation between the second EARFCN and the EARFCN in the frequency bands being used actually, obtaining the central frequency bins in the downlink frequency bands of the MulteFire includes: obtaining the central frequency bins in the downlink frequency band of the MulteFire through the formula $F_{DL}=F_{DL\_low}+0.1(N_{DL}-K-N_{Offs-DL})$; and obtaining the central frequency bins in the uplink frequency band of the MulteFire through the formula $F_{UL}=F_{UL\_low}+0.1(N_{UL}-K-N_{Offs-UL})$. wherein, $F_{DL}$ is the central frequency bin in the downlink operating frequency band, $F_{DL\_low}$ is a lowest frequency value of the downlink operating frequency band, $N_{DL}$ is an EARFCN of the downlink frequency band being used actually and corresponding to a downlink second EARFCN, $N_{Offs-DL}$ is an EARFCN offset in the downlink operating frequency band, $F_{UL-low}$ is a lowest frequency value of the uplink operating frequency band, $F_{UL}$ is a central frequency bin of the uplink operating frequency band, $N_{UL}$ is an EARFCN of the uplink frequency band being used actually and corresponding to a uplink second EARFCN, and $N_{Offs-UL}$ is an EARFCN offset in the uplink operating frequency band; K is a spacing between the second EARFCN and a corresponding reference EARFCN.

Second configuration: the first EARFCN corresponding to the frequency bins of the LAA is different from the second EARFCN corresponding to the frequency bins of the MulteFire, and the first EARFCN and the second EARFCN use different frequency bands.

Specifically, the above step 113 includes: obtaining central frequency bins in the downlink frequency band of the MulteFire through the formula: $F_{DL}=F_{DL\_low}+0.1(N_{DL}-N_{Offs-DL})$; and obtaining central frequency bins in the uplink frequency band through $F_{UL}=F_{UL\_low}+0.1(N_{UL}-N_{Offs-UL})$. wherein, $F_{DL\_low}$ is a lowest frequency value of the downlink operating frequency band, $F_{DL}$ is a central frequency bin of the downlink operating frequency band, $N_{DL}$ is a downlink second EARFCN, $N_{Offs-DL}$ is an EARFCN offset in the downlink operating frequency band, $F_{UL-low}$ is a lowest frequency value of the uplink operating frequency band, $F_{UL}$ is a central frequency bin of the uplink operating frequency band, $N_{UL}$ is a uplink second EARFCN, and $N_{Offs-UL}$ is an EARFCN offset in the uplink operating frequency band.

The first EARFCN is an EARFCN in a frequency band being actually used, and the second EARFCN corresponds to channel numbers of specific frequency band numbers not being defined currently, the specific frequency band numbers are provided with corresponding undefined EARFCN.

Specifically, specific frequency-band numbers are provided to the MulteFire, and specific frequency-band numbers are provided to each non-licensed frequency band used by the MulteFire, and the MulteFire uses an EUTRAN Band number (Band47-Band63 or Band69-Band255) not defined currently. Meanwhile, the EARFCN, MF EARFCN, in each frequency-band number of the MulteFire is configured to use EARFCNs currently not being defined (54540-65535, or 67836-262143). Additionally, EARFCN currently not being defined may also be used to indicate the entirety or the subset of the frequency bands of the MulteFire.

For example, a specific frequency band of the MulteFire corresponding to the Band 46 is configured to be Band 255. As shown in Table 2. The LAA uses the Band 46, the MulteFire uses the Band 255, and both a frequency range of the Band 46 and a frequency range of the Band 255 are 5150 MHz-5925 MHz, only frequency-band numbers of the Band 46 and the Band 255 are different.

The above Tables 4, 5, 6, and 7 are incorporated in this example. In this example, since some frequency-band numbers of the MulteFire and some frequency-band numbers of the LAA are different, the frequency-band numbers occupy different EARFCNs.

In the above example, if the measurement object is a cell configured with the entirety of the frequency bins of the designated frequency band of the MulteFire or a cell configured with a subset of the frequency bins of the designated frequency band of the MulteFire, the measurement result carries the indication field for indicating information about the measured frequency bins of the MulteFire.

The indication field is an EARFCN field added in the measurement result or any field in the measurement result.

Figure 12:
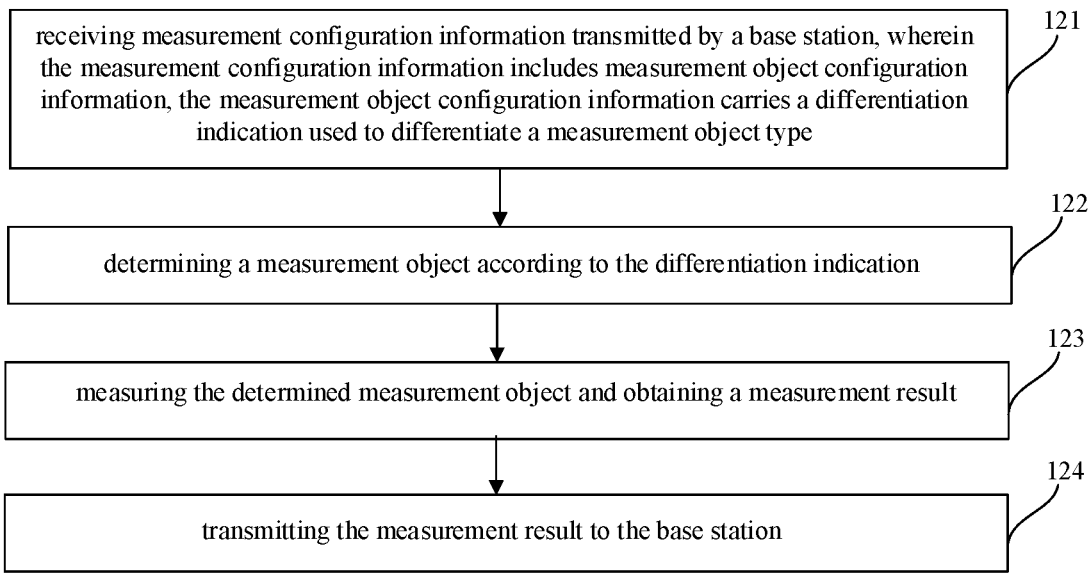
FIG. 12 is a flowchart of a measurement method for wireless communication networks performed at a terminal side according to some embodiments of the present disclosure.

FIG. 12 shows a flowchart of a measurement method for wireless communication networks according to some embodiments of the present disclosure. The method is performed at a terminal side and includes steps 121 to 124.

Step 121: receiving measurement configuration information transmitted by a base station, wherein the measurement configuration information includes measurement object configuration information, the measurement object configuration information carries a differentiation indication used to differentiate a measurement object type.

Step 122: determining a measurement object according to the differentiation indication.

Step 123: measuring the determined measurement object and obtaining a measurement result.

Step 124: transmitting the measurement result to the base station.

Specifically, the step 124 includes a step 1241.

Step 1241: transmitting a measurement result of a designated MulteFire cell by the terminal autonomously or according to the measurement-report reporting indication information in the measurement configuration information.

In the step 1241, transmitting the measurement result of the designated MulteFire cell by the terminal according to the measurement-report reporting indication information in the measurement configuration information, includes a substep 12411.

Substep 12411: transmitting the measurement result of the designated MulteFire cell to the base station by the terminal, according to measurement-report reporting indication information carried in measurement report configuration information in the measurement configuration information, or according to the measurement-report reporting indication information carried in the measurement object configuration information in the measurement configuration information; wherein the measurement-report reporting indication information is used for instructing the terminal to report the measurement result of the designated MulteFire cell.

In the step 1241, transmitting the measurement result of the designated MulteFire cell to the base station by the terminal autonomously, includes a substep 12412, or a substep 12413, or a substep 12414.

Substep 12412: if the cell being currently accessed is the MulteFire cell in the PLMN access mode or the LTE cell, only transmitting, by the terminal to the base station, the measurement result of the MulteFire cell in the PLMN access mode.

Substep 12413: if the cell being currently accessed is the MulteFire cell in the NHN access mode, only transmitting, by the terminal to the base station, the measurement result of the MulteFire cell in the NHN access mode.

Substep 12414: transmitting, by the terminal to the base station, the measurement result of the MulteFire cell which allows the terminal to hand over.

The substep 12414 further includes a sub-substep 124141 or a sub-substep 124142.

Sub-substep 124141: if the cell being currently accessed is the MulteFire cell in the PLMN access mode or the LTE cell, only transmitting, by the terminal to the base station, the measurement result of the MulteFire cell, a broadcast message of which includes a PLMN-ID list including a RPLMN or an EPLMN of the terminal.

Substep 124142: if the cell being currently accessed is the MulteFire cell in the NHN access mode, only transmitting, by the terminal to the base station, the measurement result of the MulteFire cell configured with the same NHN-ID as that of the cell being currently accessed.

In some embodiments, the measurement-report reporting indication information being used to instruct the terminal to only report the measurement result of the designated MulteFire cell, includes: the measurement-report reporting indication information is used to instruct the terminal to transmit the measurement result of the MulteFire cell in the PLMN access mode to the base station; or the measurement-report reporting indication information is used to instruct the terminal to report the measurement result of the MulteFire cell in the NHN access mode; or the measurement-report reporting indication information is used to instruct the terminal to only report the measurement result of the MulteFire cell configured with a designated PLMN-ID or a designated NHN-ID.

Further, the measurement-report reporting indication information being used to instruct the terminal to only report the measurement result of the MulteFire cell configured with the designated PLMN-ID or the designated NHN-ID, includes: the measurement-report reporting indication information includes a first PLMN-ID list, the measurement-report reporting indication information is configured to instruct the terminal to report a measurement result of a MulteFire cell, a broadcast message of which includes a PLMN-ID list including at least one same PLMN-ID as that in the first PLMN-ID list; or the measurement-report reporting indication information includes a first NHN-ID list, the measurement-report reporting indication information is used to instruct the terminal to only report a measurement result of a MulteFire cell, a broadcast message of which includes a same NHN-ID as that in the first NHN-ID list in the measurement-report reporting indication information.

Further, the measurement-report reporting indication information being used to instruct the terminal to report a measurement result of a MulteFire cell configured with a specified PLMN-ID or a specified NHN-ID, includes: the measurement-report reporting indication information is used to instruct the terminal to only report a measurement result of a MulteFire cell which allows the terminal to hand over.

Further, the MulteFire cell which allows the terminal to hand over, includes: a MulteFire cell, a broadcast message of which includes a PLMN-ID list including a RPLMN or an EPLMN of the terminal, or a MulteFire cell configured with a same NHN-ID as that of a cell currently being accessed.

Further, the measurement-report reporting indication information being used to instruct the terminal to only report a measurement result of a MulteFire cell which allows the terminal to hand over, includes: the measurement-report reporting indication information is a si-RequestForHO field included in the measurement report configuration information, wherein the si-RequestForHO field is used to instruct the terminal to only report a measurement result of a MulteFire cell which allows the terminal to hand over.

In this example, when the terminal receives the measurement configuration information transmitted by the base station, the terminal obtains the EARFCN field in the measurement object configuration information in the measurement configuration, and the terminal may distinguish the measurement object to be the LAA cell configured with the LAA frequency bins, the LTE cell configured with the LTE frequency bins, or the MulteFire cell configured with the MulteFire frequency bins through the EARFCN field.

If the measurement object is the MulteFire cell, the terminal may further obtain the measurement object is the entirety of frequency bins of frequency bands in the MulteFire, or the subset of frequency bins of frequency bands in the MulteFire, through the EARFCN or the frequency-band indication field for the MulteFire included in the measurement object configuration information.

The EARFCN and frequency-band indication field for the MulteFire is predefined by a system, and both a base station and a terminal may identify the EARFCN and the frequency-band indication field for the MulteFire.

The terminal may also obtain, through the EARFCN, the measurement object is the entirety or a subset of the frequency bins of frequency bands of the MulteFire or a single frequency bin in the MulteFire.

After the terminal measures channel qualities at the frequency bins of the MulteFire, if the measurement results satisfy a measurement report rule indicated by the measurement report configuration information included in the measurement configuration information, the terminal transmits measurement results of channel qualities of the MulteFire to the base station by using a measurement result report IE (MeasResultEUTRA) of the EUTRAN in a measurement result message (MeasResults), wherein the measurement results of channel qualities include a Reference Signal Receiving Power (RSRP) of a cell, a Reference Signal Receiving Quality (RSRQ) and/or a Cell Global Identifier (CGI) and the like of a cell, and the CGI of the cell includes a EUTRAN Cell Global Identifier (ECGI) and a Tracking Area Code (TAC) and probably further includes PLMN information and a NHN-ID. A measurement identifier (measID) in the measurement result message corresponds to the measurement identifier (measID) included in the measurement configuration information for the MulteFire. Each MeasResultEUTRA includes a measurement result of a cell, and a measurement result message at most includes measurement results of eight cells.

If the base station instructs, in the measurement configuration information of the MulteFire, the terminal to measure the entirety of the frequency bands of the MulteFire or the subset of the frequency bands of the MulteFire, but not to measure a single frequency bin only, the terminal needs to indicate information about the frequency bins of the measured MulteFire cell in a measurement result message when the terminal transmits the measurement result message, or the terminal indicates the frequency bins of the measured MulteFire cell in a measurement result IE (MeasResultEUTRA) of each cell in the measurement result message (for example, adding an EARFCN field in the MeasResultEUTRA), so that the base station may acquires the frequency bins in the measurement result. If the base station indicates, in the measurement configuration of the MulteFire, the terminal to measure a single frequency bin, the terminal does not need to indicate the EARFCN of the measured MulteFire cell in the measurement result message.

Information about the measured frequency bins in the measurement result message may be indicated in two ways as follow by the terminal.

First way: adding an EARFCN field in the measurement result IE (MeasResultEUTRA).

Second way: carrying information about the frequency bins in other fields in the measurement result IE (MeasResultEUTRA).

For example, the terminal adds a field length occupied by the MeasID field in the measurement result IE, uses the MeasID to carry the information about the frequency bins, i.e., the MeasID field includes both information about a measurement identifier and the information about the frequency bins.

The information about the frequency bins may be the EARFCN, or may be index values of the frequency bins in the measured frequency bands.

If the base station instructs the terminal to measure the channel qualities of MulteFire cells at frequency bins of the entirety of designated frequency bands of the MulteFire or at frequency bins of a subset of designated frequency bands of the MulteFire, the base station acquires the frequency bins corresponding to the measurement results from the information about the frequency bins in the measurement results.

If the base station instructs, through the EARFCN or the frequency-band indication field of the MulteFire in the measurement object configuration information, the terminal to measure the channel qualities of the MulteFire cells at frequency bins of the entirety of designated frequency bands of the MulteFire or at frequency bins of the subset of the designated frequency bands of the MulteFire, the base station acquires the frequency bins corresponding to the measurement results from the information about the frequency bins in the measurement results, and, according to the measurement results from the terminal at different frequency bins, the base station hands over the terminal from the LTE cell to the MulteFire cell configured with designated frequency bins.

On the other hand, if the terminal receives the measurement configuration information transmitted by the base station, the terminal obtains the EARFCN field in the measurement object configuration information in the measurement configuration information, and the terminal may distinguish the measurement object to be the LAA cell, or the LTE cell, or the MulteFire cell through the EARFCN field.

The terminal may also acquire the measurement object is the entirety of the frequency bands of the MulteFire or the subset of the frequency bands of the MulteFire through the EARFCN or the frequency-band indication field of the MulteFire. The EARFCN and frequency-band indication field of the MulteFire are predefined by a system, and both a base station and a terminal may identify the EARFCN and the frequency-band indication field in the MulteFire.

If the measurement results of the measurement objects of the above MulteFire cells generated by the terminal satisfy a measurement report condition indicated in the measurement report configuration IE included in the measurement configuration, the terminal autonomously select or select according to measurement-report reporting indication information from the base station, a measurement result of a MulteFire cell and transmits the measurement result to the base station.

In a 3GPP network, a measurement report type configured in a measurement report configuration IE includes an event-triggered measurement report, a periodic measurement report and a CGI measurement report.

The event-triggered measurement report is configured for a handover procedure. When measured results of MulteFire neighboring cells generated by the terminal satisfy a trigger condition of the event-triggered measurement report indicated in the measurement report configuration IE, the terminal reports, to the base station the measurement results of the MulteFire neighboring cells in a descending order of signal qualities from a best signal quality to a worst signal quality. An EUTRAN measurement event includes events of A1-A6, B1-B2 and C1-C2.

The periodic measurement report is configured for network optimization (such as Automatic Neighbor Relationship (ANR)). The terminal periodically reports measurement results of neighboring cells having best signal qualities to the base station according to the descending sequence of the signal qualities from the best signal quality to the worst signal quality.

The CGI measurement report is configured for solving a PCI (Physical Cell Identifier) confusion problem or performing the ANR. when the terminal reads the CGI (including the ECGI, the TAC and the like) in a broadcast message of a neighboring cell designated by the base station, the CGI information of the neighboring cell is reported to the base station by the terminal.

In the MulteFire network in the PLMN access mode or in the LTE network, the neighbor relation is not allowed to be established with a MulteFire network in the NHN access mode, and the terminal is only allowed to be handed over to a MulteFire cell provided with a RPLMN or an EPLMN of the terminal. In the MulteFire network in the NHN access mode, the neighbor relation is not allowed to be established with a MulteFire network in the PLMN access mode, and the terminal is only allowed to hand over within the current NH network (namely cells with the same NHN-ID). Since the MulteFire operates in the non-licensed frequency band, MulteFire networks of a plurality of Mobile Network Operators (MNOs) may probably use same operational frequency bins concurrently, i.e., a terminal may measure MulteFire cells of a plurality of PLMNs or MulteFire cells of a plurality of NH networks at a non-licensed frequency bin. If according to the related art, measurement results of MulteFire cells satisfying a measurement report criterion is transmitted to the base station in a descending order of channel qualities from a best channel quality to a worst channel quality by the terminal, the terminal probably transmits, to the base station, a plurality of measurement results of MulteFire cells needing not to be measured, and probably cannot transmit, to the base station, measurement results of MulteFire cells needed by the base station. This significantly increases uplink signaling overheads, reduces system performance, and even cannot achieve an object of a measurement.

In order to save signaling overheads and measure the MulteFire neighboring cell more effectively, the terminal selects the measurement result of the MulteFire cell to be transmitted to the base station in two ways as follow.

First way: the terminal autonomously selects the measurement result of the MulteFire cell and transmits the measurement result to the base station.

When a network type of a current cell is the MulteFire network in the PLMN access mode or the LTE network, the terminal only transmits the measurement result of the MulteFire cell in the PLMN access mode to the base station, or only transmits, to the base station, the measurement result of the MulteFire cell which allows the terminal to hand over.

In some embodiments, the terminal may simultaneously implement transmissions of a measurement result of a cell to the base station according to the following three measurement report types, and may also implement transmission of the measurement result of the cell to the base station according to the three measurement report types at different time points.

1. The Measurement Report Type is the Event-Triggered Measurement Report

When the measurement results of the MulteFire neighbor cells generated by the terminal satisfy an event-triggered condition indicated in the measurement report configuration information element (Information Element (IE)), in order to only report the measurement result of the cell which allows the terminal to hand over, the terminal only reports the measurement result of a MulteFire cell, a broadcast message of which includes a PLMN-ID list including the same PLMN as the RPLMN or the EPLMN. If a plurality of MulteFire cells satisfy the condition, measurement results of the plurality of MulteFire cells are reported in the descending order of channel qualities from the best channel quality to the worst channel quality. The measurement results include the PCIs and the channel qualities (RSRP and/or RSRQ) of the MulteFire cells.

When the measurement results of the MulteFire neighbor cells generated by the terminal satisfy the event-triggered condition indicated in the measurement report configuration IE, the terminal only reports measurement results of MulteFire cells in the PLMN access mode. If a plurality of MulteFire cells satisfy the condition, measurement results of the MulteFire cells are reported in the descending order of channel qualities. The measurement results include the PCIs and the channel qualities (RSRP and/or RSRQ) of the MulteFire cells.

Furthermore, in order to solve a problem that PCIs of MulteFire cells deployed by different MNOs conflict with each other, if the terminal has acquired the CGI information of the MulteFire cells, the terminal may also incorporate the CGI information in the measurement results of the cells.

2. The Measurement Report Type is the Periodic Measurement Report

After periodic measurement is carried out on the MulteFire neighbor cells by the terminal, only the measurement results of the MulteFire cells in the PLMN access mode are reported. If a plurality of MulteFire cells satisfy the condition, measurement results of the MulteFire cells are reported in the descending order of channel qualities from the best channel quality to the worst channel quality. The measurement results include the PCIs and the channel qualities (RSRP and/or RSRQ) of the MulteFire cells. Furthermore, in order to solve a problem that PCIs of MulteFire cells deployed by different MNOs conflict with each other, if the terminal has acquired the CGI information of the MulteFire cells, the terminal may also incorporate the CGI information in the measurement results of the cells.

Optionally, when the terminal performs the periodic measurement on the MulteFire neighbor cells, a measurement result of a MulteFire cell, a broadcast message of which includes a PLMN-ID list including the same PLMN as the RPLMN or the EPLMN, is reported. If a plurality of MulteFire cells satisfy the condition, measurement results of the MulteFire cells are reported in the descending order of channel qualities from the best channel quality to the worst channel quality. The measurement results include the PCIs and the channel qualities (RSRP and/or RSRQ) of the MulteFire cells. Furthermore, in order to solve a problem that PCIs of MulteFire cells deployed by different MNOs conflict with each other, if the terminal has acquired the CGI information of the MulteFire cells, the terminal may also incorporate the CGI information in the measurement results of the cells.

3. The Measurement Report Type is the CGI Measurement Report.

When the terminal measures the CGI of a designated target MulteFire cell, the terminal reports the ECGI and the TAC in the CGI information of the MulteFire cell. In order to save the signaling overheads, the terminal does not report the NHN-ID. the terminal only reports the PLMN-ID list of the MulteFire cell in the PLMN access mode, or a PLMN in the PLMN-ID list broadcast by the MulteFire cell which is the same as the RPLMN or the EPLMN.

When a network type of a current cell is the MulteFire network in the NHN access mode, the terminal only transmits the measurement result of the MulteFire cell in the NHN access mode to the base station, or only transmits, to the base station, the measurement result of the MulteFire cell in the NHN access mode which allows the terminal to hand over.

For example, the terminal may simultaneously implement transmission a measurement result of a cell to the base station according to the following three measurement report types, and may also implement transmission of the measurement result of the cell to the base station according to the three measurement report types at different time points.

1. The Measurement Report Type is the Event-Triggered Measurement Report

When the measurement results of the MulteFire neighbor cells generated by the terminal satisfy an event-triggered condition indicated in the measurement report configuration IE, the terminal only reports a measurement result of a MulteFire cell in the NHN access mode. If a plurality of MulteFire cells satisfy the condition, measurement results of the MulteFire cells are reported in the descending order of channel qualities from the best channel quality to the worst channel quality. The measurement results include the PCI sand the channel qualities (RSRP and/or RSRQ) of the MulteFire cells.

Optionally, when the measurement results of the MulteFire neighbor cells generated by the terminal satisfy the event-triggered condition indicated in the measurement report configuration IE, for sake of only reporting the measurement result of the MulteFire cell in the NHN network mode which allows the terminal to hand over, the terminal only reports the measurement result of the MulteFire cell which broadcasts a same NHN-ID as the NHN-ID of a cell currently being accessed. If a plurality of MulteFire cells satisfy the condition, measurement results of the MulteFire cells are reported in the descending order of channel qualities from the best channel quality to the worst channel quality. The measurement results include the PCIs and the channel qualities (RSRP and/or RSRQ) of the MulteFire cells.

Furthermore, in order to solve the problem that PCIs of MulteFire cells in different NH networks conflict with each other, if the terminal has acquired the CGI information of the MulteFire cells, the terminal may also incorporate the CGI information in the measurement results of the cells, the CGI information includes the NHN-ID of the MulteFire cells.

2. The Measurement Report Type is the Periodic Measurement Report

After the periodic measurement is carried out on the MulteFire neighbor cells by the terminal, only the measurement result of the MulteFire cell in the NHN access mode is reported. If a plurality of MulteFire cells satisfy the condition, measurement results of the MulteFire cells are reported in the descending order of channel qualities from the best channel quality to the worst channel quality. The measurement results include the PCIs and the channel qualities (RSRP and/or RSRQ) of the MulteFire cells.

Optionally, after the periodic measurement is carried out on the MulteFire neighbor cells by the terminal, the terminal reports only the measurement result of the MulteFire cell which broadcasts the same NHN-ID as the NHN-ID of the cell currently being accessed. If a plurality of MulteFire cells satisfy the condition, measurement results of the MulteFire cells are reported in the descending order of channel qualities from the best channel qualities to the worst channel qualities. The measurement results include the PCIs and the channel qualities (RSRP and/or RSRQ) of the MulteFire cells.

Furthermore, in order to solve the problem that PCIs of MulteFire cells in different NH networks conflict with each other, if the terminal has acquired the CGI information of the MulteFire cells, the terminal may also incorporate the CGI information in the measurement results of the cells, the CGI information includes the NHN-ID.

3. The Measurement Report Type is the CGI Measurement Report.

When the terminal measures the CGI of a designated target MulteFire cell, the terminal reports the ECGI and the TAC in the CGI information of the MulteFire cell. In order to save the signaling overheads, the PLMN-ID list is not reported. The terminal reports the NHN-ID, or only reports the NHN-ID of the MulteFire cell which is the same as the NHN-ID of the current cell.

Second way: the terminal, according to the measurement report reporting indication from the base station, selects a measurement result of a MulteFire cell satisfying the measurement report condition and required by the base station, and sends the measurement result to the base station.

The base station transmits the measurement report reporting indication field in the measurement object IE or the measurement report configuration IE in the measurement configuration.

The measurement report reporting indication field may be used to instruct the terminal to only report a measurement result of a MulteFire cell in the PLMN access mode or only report a measurement result of a MulteFire cell in the NHN access mode.

The measurement report reporting indication field may also be used to instruct the terminal to only report a measurement result of a MulteFire cell of a designated PLMN or a MulteFire cell configured with a designated NHN-ID. For example, if the terminal accesses currently a MulteFire cell in the PLMN access mode or an LTE cell, the measurement report reporting indication is used to instruct the terminal to only report the measurement result of the MulteFire cell, a broadcast message of which includes a PLMN-ID list including the RPLMN or the EPLMN of the terminal. If the terminal accesses the MulteFire cell in the NHN access mode, the measurement report reporting indication field is used to instruct the terminal only to report the measurement result of the MulteFire cell configured with the same NHN-ID as that of a cell currently being accessed.

Optionally, the measurement report reporting indication field includes a PLMN-ID list, and instructs the terminal to only report the measurement result of the MulteFire cell, a broadcast message of which includes a PLMN-ID list including at least one PLMN-ID in the PLMN-ID list in the measurement report reporting indication field; or the measurement report reporting indication field includes a NHN-ID list, and instructs the terminal to only report a measurement result of a MulteFire cell, a broadcast message of which includes at least one same NHN-ID as that in the NHN-ID list in the measurement report reporting indication field. The measurement report reporting indication field may be one or more fields.

For example, the measurement report reporting indication field is added in the measurement object IE or the measurement report configuration IE in the measurement configuration. The field is applicable to all of the measurement report types (the event-triggered measurement report, the periodic measurement report, or the CGI measurement report). The measurement report reporting indication field may be used to instruct the terminal to only report a measurement result of a MulteFire cell in the PLMN access mode or only report a measurement result of a MulteFire cell in the NHN access mode; or the field may be used to instruct the terminal to report a measurement result of a MulteFire cell in a designated PLMN or a measurement result of a MulteFire cell configured with a designated NHN-ID. The field may further include a PLMN-ID list or an NHN-ID list which is used to instruct the terminal only reports the measurement result of the MulteFire cell in a designated PLMN or the measurement result of the MulteFire cell configured with a designated NHN-ID.

The related si-RequestForHO field is used to instruct the terminal to only report the CGI information of the MulteFire cell which allows the terminal to hand over, and is applicable to a measurement for a case in which the measurement report type is the CGI measurement report.

Specifically, after the terminal receives the si-RequestForHO indication transmitted by the base station, and if the terminal currently accesses the MulteFire cell in the PLMN access mode or the LTE cell, then when the terminal measures and obtains the CGI of the designated target MulteFire cell, the terminal does not report the NHN-ID, but only reports a measurement result of a MulteFire cell in which the PLMN-ID list broadcast by the MulteFire cell is the same as the RPLMN or the EPLMN of the terminal. If the terminal accesses currently the MulteFire cell in the NHN access mode, then when the terminal measures and obtains the CGI of the designated target MulteFire cell, the terminal does not report the PLMN-ID list, but reports only the measurement result of the MulteFire cell configured with the same NHN-ID as that of the cell currently being accessed.

In some embodiments, the base station receives the measurement results transmitted by the terminal, after the terminal measures the measurement object indicated in the measurement configuration transmitted by the base station. The network optimization may be performed according to measurement results transmitted by the terminal, or the terminal may be handed over from the LTE network to the MulteFire neighbor cell, or a neighbor-cell relation is established with the MulteFire neighbor cell.

In the above embodiments of the present disclosure, directed to a measurement process of a MulteFire cell, the method of the present disclosure may enable the terminal to report, to the base station, measurement results of MulteFire cells needed by the base station, and thus may avoid the terminal from transmitting, to the base station, measurement results of MulteFire cells needing not to be measured. In this way, uplink signaling overheads may be reduced, system performance may be enhanced, and measurements to MulteFire neighboring cells may be effectively performed.

Further, directed to problems in the related art that a measurement object in a LAA neighboring cell and a measurement object of a MulteFire neighboring cell may not be differentially indicated and how to enable the terminal to measure frequency bins in an entirety or a part of MulteFire frequency bands, some embodiments of the present disclosure may enable the terminal to differentiate the measurement object of the LAA from the measurement object of the MulteFire, and enable the terminal to measure channel qualities at frequency bins in the entirety or a part of the MulteFire frequency bands, so that the handover from the LTE network to the MulteFire network by the terminal may be supported.

In the above embodiments of the present disclosure, measurement result transmitted to the base station carries a same measurement identifier as that in the measurement configuration information.

In the above embodiments of the present disclosure, the measurement results transmitted to the base station carry measurement results of less than eight cells.

Figure 13:
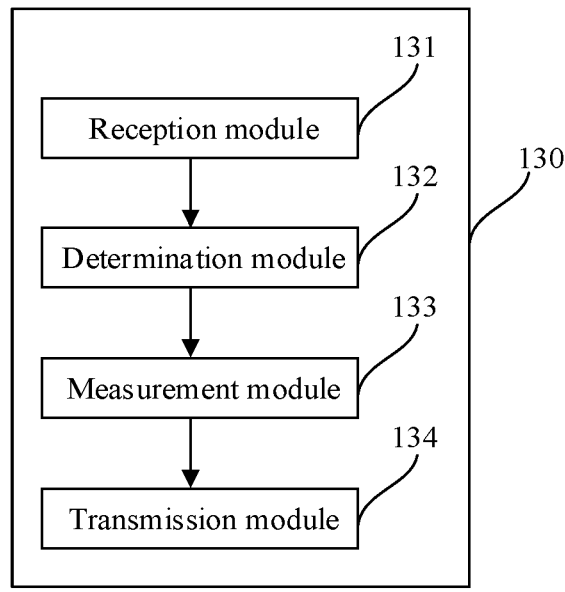
FIG. 13 is a structural block diagram of a measurement apparatus for wireless communication networks at a terminal side according to some embodiments of the present disclosure.

FIG. 13 shows a measurement apparatus for a wireless communication network according to some embodiments of the present disclosure. The measurement apparatus 130 shown in FIG. 13 may be included in the terminal and may include a reception module 131, a determination module 132, a measurement module 133 and a transmission module 134.

The reception module 131 is configured to receive measurement configuration information transmitted by a base station, wherein the measurement configuration information includes measurement object configuration information, and the measurement object configuration information carries a differentiation indication used to differentiate a measurement object type.

The determination module 132 is configured to determine a measurement object according to the differentiation indication, wherein the measurement object type includes a LAA cell configured with LAA frequency bins, a LTE cell configured with LTE frequency bins, or a MulteFire cell configured with MulteFire frequency bins, the differentiation indication is the EARFCN.

The measurement module 133 is configured to measure the determined measurement object and obtain measurement results.

The transmission module 134 is configured to transmit the measurement results to the base station.

It should be noted that, the apparatus in this example is apparatus corresponding to the method performed at the terminal side in the above embodiments, and all implementations in the method performed at the terminal side in the above embodiments are applicable to the apparatus in the example and may achieve the same technical effects.

Figure 14:
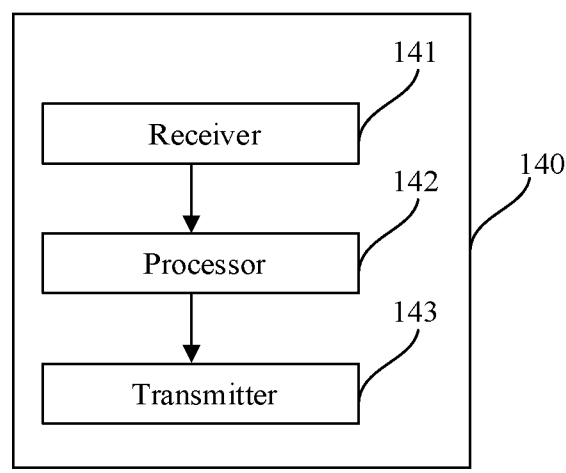
FIG. 14 is a structural block diagram of a terminal according to some embodiments of the present disclosure.

FIG. 14 shows a terminal according to some embodiments of the present disclosure. The terminal 140 shown in FIG. 14 includes a receiver 141, a processor 142 and a transmitter 143.

The receiver 141 is configured to receive measurement configuration information transmitted by the base station, wherein the measurement configuration information includes measurement object configuration information, and the measurement object configuration information carries a differentiation indication used to differentiate a measurement object type.

The processor 142 is configured to determine a measurement object according to the differentiation indication, wherein the measurement object type includes a LAA cell configured with LAA frequency bins, a LTE cell configured with LTE frequency bins, or a MulteFire cell configured with MulteFire frequency bins, the differentiation indication is the EARFCN; and measure the determined measurement object and obtain measurement results.

The transmitter 143 is configured to transmit the measurement results to the base station.

It should be noted that, the apparatus in this example is apparatus corresponding to the method performed at the terminal side in the above embodiments, and all implementations in the method performed at the terminal side in the above embodiments are applicable to the apparatus in the example and may achieve the same technical effects.

The terminal in the embodiments of the present disclosure may be a mobile phone (or a handset), or other devices capable of transmitting or receiving wireless signals including a User Equipment (UE), a personnel digital assistance (PDA), a wireless Modulator and Demodulator (Modem), a wireless communication device, a handhold device, a laptop, a wireless phone, a wireless local loop (WLL) station, a Customer Premise of Equipment (CPE) or a MiFi capable of transforming a cellular signal to a Wi-Fi signal, an intelligent household electrical appliance, or other devices capable of automatically communicate with a mobile communication network without operations of a user.

The above embodiments of the present disclosure may enable the terminal to report to the base station measurement results of MulteFire cells needed by the base station, and thus may avoid the terminal from transmitting, to the base station, measurement results of MulteFire cells needing not to be measured. In this way, uplink signaling overheads may be reduced, system performance may be enhanced, and measurements to MulteFire neighboring cells may be effectively performed.

Further, directed to the problems in the related art that a measurement object in a LAA neighboring cell and a measurement object of a MulteFire neighboring cell cannot be differentially indicated and how to enable the terminal to measure at frequency bins in an entirety or a part of MulteFire frequency bands, some embodiments of the present disclosure may enable the terminal to differentiate the measurement object of the LAA from the measurement object of the MulteFire, and enable the terminal to measure channel qualities of frequency bins of the entirety or the part of the MulteFire frequency bands, so that the handover from the LTE network to the MulteFire network by the terminal may be supported.

The above described embodiments of the present disclosure are optional embodiments. It should be noted that numerous modifications and embellishments may be made by one of ordinary skills in the art without departing from the spirit of the present disclosure, and such modifications and embellishments also fall within the scope of the present disclosure.

What is claimed is:

1. A measurement method for wireless communication networks, comprising:
   transmitting measurement configuration information to a terminal, wherein the measurement configuration information comprises measurement object configuration information, the measurement object configuration information carries a differentiation indication usable to differentiate a measurement object type;
   receiving a measurement result transmitted by the terminal after the terminal measures a determined measurement object, wherein the determined measurement object is determined according to the differentiation indication by the terminal, the measurement object type comprises a Licensed Assisted Access (LAA) cell configured with LAA frequency bins, a Long Term Evolution (LTE) cell configured with LTE frequency bins, or a MulteFire cell configured with MulteFire frequency bins; and the differentiation indication is an Absolute Radio Frequency Channel Number.

2. The measurement method for wireless communication networks according to claim 1, wherein, in a case that the measurement object type is a cell in a MulteFire network, the differentiation indication is further used to indicate measuring at designated frequency bins in designated frequency bands of the MulteFire network or measuring at an entirety of frequency bins in frequency bands of a designated MulteFire network or measuring at a subset of frequency bins in frequency bands of the designated MulteFire network; or the measurement object configuration information further carries a MulteFire frequency-band indication field, the MulteFire frequency-band indication field is used to indicate measuring at the entirety of the frequency bins in the frequency bands of the designated MulteFire network or at the subset of the frequency bins in the frequency bands of the designated MulteFire network; and/or
   a first Absolute Radio Frequency Channel Number corresponding to the LAA frequency bins is different from a second Absolute Radio Frequency Channel Number corresponding to the MulteFire frequency bins, and the first Absolute Radio Frequency Channel Number and the second Absolute Radio Frequency Channel Number belong to same frequency bands; the first Absolute Radio Frequency Channel Number is an Absolute Radio Frequency Channel Number in a frequency band actually being used; and the second Absolute Radio Frequency Channel Number is an Absolute Radio Frequency Channel Number in a frequency band actually not being used.

3. The measurement method for wireless communication networks according to claim 1, wherein, a first Absolute Radio Frequency Channel Number corresponding to frequency bins of the LAA is different from a second Absolute Radio Frequency Channel Number corresponding to frequency bins of the MulteFire, and the first Absolute Radio Frequency Channel Number and the second Absolute Radio Frequency Channel Number belong to same frequency bands;
   the first Absolute Radio Frequency Channel Number is an Absolute Radio Frequency Channel Number in a frequency band being actually used, and
   the second Absolute Radio Frequency Channel Number is a channel number of a specific frequency band number not being defined currently, and the specific frequency band number is provided with a corresponding undefined Absolute Radio Frequency Channel Number.

4. The measurement method for wireless communication networks according to claim 3, wherein, the second Absolute Radio Frequency Channel Number belongs to one or more frequency band numbers in Band 69 to Band 255;
   the second Absolute Radio Frequency Channel Number is one or more channel numbers in 67836 to 262143, or the second Absolute Radio Frequency Channel Number belongs to a frequency-band range from 5150 MHz to 5925 MHz.

5. The measurement method for wireless communication networks according to claim 1, wherein, the measurement configuration information further comprises measurement report configuration information;
   the measurement report configuration information carries measurement-report reporting indication information, or the measurement object configuration information in the measurement configuration information carries the measurement-report reporting indication information;
   the measurement-report reporting indication information is configured to instruct the terminal to report a measurement result of a designated MulteFire cell.

6. The measurement method for wireless communication networks according to claim 5, wherein, the measurement-report reporting indication information is configured to instruct the terminal to report only a measurement result of a MulteFire cell in a Public Land Mobile Network (PLMN) access mode or report only a measurement result of a MulteFire cell in a Neutral Host Network (NHN) access mode; or
   the measurement-report reporting indication information is configured to instruct the terminal to report only a measurement result of a MulteFire cell configured with a designated Public Land Mobile Network Identifier (PLMN-ID) or a designated Neutral Host Network Identifier (NHN-ID).

7. The measurement method for wireless communication networks according to claim 6, wherein, the measurement-report reporting indication information being configured to instruct the terminal to report only the measurement result of the MulteFire cell configured with the designated PLMN-ID or the designated NHN-ID, comprises:
the measurement-report reporting indication information comprises a first PLMN-ID list, and is configured to instruct the terminal to report only a measurement result of a MulteFire cell in which a PLMN-ID list in a broadcast message of the MulteFire cell comprises at least one PLMN-ID in the first PLMN-ID list; or
the measurement-report reporting indication information comprises a first NHN-ID list, and is configured to instruct the terminal to report only a measurement result of a MulteFire cell in which a NHN-ID in a broadcast message of the MulteFire cell is same as one NHN-ID in the first NHN-ID list in the measurement-report reporting indication information.

8. The measurement method for wireless communication networks according to claim 6, wherein, the measurement-report reporting indication information is configured to instruct the terminal to report only the measurement result of the MulteFire cell configured with the designated PLMN-ID or the designated NHN-ID, comprise:
the measurement-report reporting indication information is configured to instruct the terminal to report only a measurement result of a MulteFire cell which allows the terminal to hand over.

9. The measurement method for wireless communication networks according to claim 8, wherein, the MulteFire cell which allows the terminal to hand over, comprises:
a MulteFire cell in which a PLMN-ID list in a broadcast message of the MulteFire cell comprises a Registered Public Land Mobile Network (RPLMN) or an Equivalent Public Land Mobile Network (EPLMN) of the terminal; or
a MulteFire cell configured with a same NHN-ID as that of a cell currently accessed.

10. The measurement method for wireless communication networks according to claim 8, wherein, the measurement-report reporting indication information being configured to instruct the terminal to report only the measurement result of the MulteFire cell which allows the terminal to hand over, comprises:
the measurement-report reporting indication information is a si-RequestForHO field comprised in the measurement report configuration information, and the si-RequestForHO field is configured to instruct the terminal to report the measurement result of the MulteFire cell which allows the terminal to hand over.

11. A measurement method for wireless communication networks, comprising:
receiving measurement configuration information transmitted by a base station, wherein the measurement configuration information comprises measurement object configuration information, the measurement object configuration information carries a differentiation indication used to differentiate a measurement object type;
determining a measurement object according to the differentiation indication, wherein the measurement object type comprises a Licensed Assisted Access (LAA) cell configured with LAA frequency bins, a Long Term Evolution (LTE) cell configured with LTE frequency bins, or a MulteFire cell configured with MulteFire frequency bins, and the differentiation indication is an Absolute Radio Frequency Channel Number;
measuring the determined measurement object and obtaining a measurement result; and
transmitting the measurement result to the base station.

12. The measurement method for wireless communication networks according to claim 11, wherein, the determining a measurement object according to the differentiation indication, comprises:
in a case that the differentiation indication is a first Absolute Radio Frequency Channel Number corresponding to the LAA frequency bins, determining that the measurement object is the LAA cell;
in a case that the differentiation indication is a second Absolute Radio Frequency Channel Number corresponding to the MulteFire frequency bins, determining that the measurement object is the MulteFire cell; and
in a case that the differentiation indication is a third Absolute Radio Frequency Channel Number corresponding to the LTE frequency bins, determining that the measurement object is the LTE cell.

13. The measurement method for wireless communication networks according to claim 12, wherein, after determining that the measurement object is the MulteFire cell, the method further comprises:
according to the second Absolute Radio Frequency Channel Number or a frequency-band indication for the MulteFire carried in the measurement object configuration information, determining that the measurement object is a cell configured with designated frequency bins in designated frequency bands of the MulteFire, or a cell configured with an entirety of frequency bins in designated frequency bands of the MulteFire, or a cell configured with a subset of frequency bins in designated frequency bands of the MulteFire.

14. The measurement method for wireless communication networks according to claim 13, wherein, the first Absolute Radio Frequency Channel Number corresponding to the LAA frequency bins is different from the second Absolute Radio Frequency Channel Number corresponding to the MulteFire frequency bins, and the first Absolute Radio Frequency Channel Number and the second Absolute Radio Frequency Channel Number belong to same frequency bands;
the first Absolute Radio Frequency Channel Number is an Absolute Radio Frequency Channel Number in a frequency band actually being used;
the second Absolute Radio Frequency Channel Number is an Absolute Radio Frequency Channel Number in a frequency band actually not being used; and
wherein, the measuring the determined measurement object and obtaining the measurement result, comprises:
obtaining central frequency bins of the MulteFire according to a mapping relation between the second Absolute Radio Frequency Channel Number and the Absolute Radio Frequency Channel Number in the frequency band being used actually; and
measuring a cell configured with the central frequency bins of the MulteFire and obtaining the measurement result.

15. The measurement method for wireless communication networks according to claim 14, wherein, the obtaining central frequency bins of the MulteFire according to the mapping relation between the second Absolute Radio Frequency Channel Number and the Absolute Radio Frequency Channel Number in the frequency band being used actually, comprises:
obtaining a central frequency bin in a downlink frequency band of the MulteFire through a formula: $F_{DL}=F_{DL\_low}+0.1(N_{DL}-N_{Offs-DL})$; and
obtaining a central frequency bin in a uplink frequency band of the MulteFire through a formula: $F_{UL}=F_{UL\_low}+0.1(N_{UL}-N_{Offs-UL})$;
wherein, $F_{DL\_low}$ is a lowest frequency value in the downlink operating frequency band, $F_{DL}$ is the central frequency bin of the downlink operating frequency band, $N_{DL}$ is an Absolute Radio Frequency Channel Number in the downlink frequency band being used actually corresponding to a downlink second Absolute Radio Frequency Channel Number, $N_{Offs-DL}$ is an Absolute Radio Frequency Channel Number offset in the downlink operating frequency band,
$F_{UL\_low}$ is a lowest frequency value in the uplink operating frequency band, $F_{UL}$ is the central frequency bin of the uplink operating frequency band, $N_{UL}$ is an Absolute Radio Frequency Channel Number in the uplink frequency band being used actually corresponding to a uplink second Absolute Radio Frequency Channel Number, and $N_{Offs-UL}$ is an Absolute Radio Frequency Channel Number offset in the uplink operating frequency band; or
the obtaining central frequency bins of the MulteFire according to the mapping relation between the second Absolute Radio Frequency Channel Number and the Absolute Radio Frequency Channel Number in the frequency band being used actually, comprises:
obtaining a central frequency bin in a downlink frequency band of the MulteFire through a formula: $F_{DL}=F_{DL\_low}+0.1(N_{DL}-K-N_{Offs-DL})$; and
obtaining a central frequency bin in a uplink frequency band of the MulteFire through a formula: $F_{UL}=F_{UL\_low}+0.1(N_{UL}-K-N_{Offs-UL})$;
wherein, $F_{DL\_low}$ is a lowest frequency value in the downlink operating frequency band, $F_{DL}$ is the central frequency bin of the downlink operating frequency band, $N_{DL}$ is an Absolute Radio Frequency Channel Number in the downlink frequency band being used actually corresponding to a downlink second Absolute Radio Frequency Channel Number, $N_{Offs-DL}$ is an Absolute Radio Frequency Channel Number offset in the downlink operating frequency band,
$F_{UL\_low}$ is a lowest frequency value in the uplink operating frequency band, $F_{UL}$ is the central frequency bin of the uplink operating frequency band, $N_{UL}$ is an Absolute Radio Frequency Channel Number in the uplink frequency band being used actually corresponding to a uplink second Absolute Radio Frequency Channel Number, and $N_{Offs-UL}$ is an Absolute Radio Frequency Channel Number offset in the uplink operating frequency band;
K is a spacing between the second Absolute Radio Frequency Channel Number and an Absolute Radio Frequency Channel Number being used actually corresponding to the second Absolute Radio Frequency Channel Number, and K is smaller than 200.

16. The measurement method for wireless communication networks according to claim 13, wherein,
the first Absolute Radio Frequency Channel Number corresponding to the LAA frequency bins is different from the second Absolute Radio Frequency Channel Number corresponding to the MulteFire frequency bins, and the first Absolute Radio Frequency Channel Number and the second Absolute Radio Frequency Channel Number belong to different frequency bands;
the first Absolute Radio Frequency Channel Number is an Absolute Radio Frequency Channel Number in a frequency band actually being used; and
the second Absolute Radio Frequency Channel Number is a channel number of a specific frequency band number not being defined currently, and the specific frequency band number is provided with a corresponding undefined Absolute Radio Frequency Channel Number;
wherein, the measuring the determined measurement object and obtaining the measurement result, comprises:
obtaining a central frequency bin in a downlink frequency band of the MulteFire through a formula: $F_{DL}=F_{DL\_low}+0.1(N_{DL}-N_{Offs-DL})$; and
obtaining a central frequency bin in a uplink frequency band of the MulteFire through a formula: $F_{UL}=F_{UL\_low}+0.1(N_{UL}-N_{Offs-UL})$;
wherein, $F_{DL\_low}$ is a lowest frequency value in the downlink operating frequency band, $F_{DL}$ is the central frequency bin of the downlink operating frequency band, $N_{DL}$ is a downlink second Absolute Radio Frequency Channel Number, $N_{Offs-DL}$ is an Absolute Radio Frequency Channel Number offset in the downlink operating frequency band,
$F_{UL\_low}$ is a lowest frequency value in the uplink operating frequency band, $F_{UL}$ is the central frequency bin of the uplink operating frequency band, $N_{UL}$ is a uplink second Absolute Radio Frequency Channel Number, and $N_{Offs-UL}$ is an Absolute Radio Frequency Channel Number offset in the uplink operating frequency band.

17. The measurement method for wireless communication networks according to claim 13, wherein, in a case that the measurement object is the cell configured with the entirety of frequency bins in designated frequency bands of the MulteFire, or the cell configured with the subset of frequency bins in designated frequency bands of the MulteFire, the measurement result carries an indication field for indicating the measured frequency bins of the MulteFire.

18. The measurement method for wireless communication networks according to claim 17, wherein, the indication field is an Absolute Radio Frequency Channel Number field added in the measurement result or any field in the measurement result.

19. The measurement method for wireless communication networks according to claim 11, wherein, the transmitting the measurement result to the base station, comprises:
transmitting the measurement result of a designated MulteFire cell to the base station by a terminal autonomously or according to measurement-report reporting indication information in the measurement configuration information.

20. A terminal, comprising:
a receiver, configured to receive measurement configuration information transmitted by a base station, wherein the measurement configuration information comprises measurement object configuration information, the measurement object configuration information carries a differentiation indication used to differentiate a measurement object type;
a processor, configured to: determine a measurement object according to the differentiation indication, wherein the measurement object type comprises a Licensed Assisted Access (LAA) cell configured with LAA frequency bins, a Long Term Evolution (LTE) cell configured with LTE frequency bins, or a MulteFire cell configured with MulteFire frequency bins, and the differentiation indication is an Absolute Radio Frequency Channel Number; and measure the determined measurement object and obtain a measurement result; and a transmitter, configured to transmit the measurement result to the base station.

\* \* \* \* \*